US009832385B2

(12) United States Patent
Kuwabara et al.

(10) Patent No.: US 9,832,385 B2
(45) Date of Patent: Nov. 28, 2017

(54) DISPLAY DEVICE AND CONTROL METHOD

(71) Applicant: FUJITSU LIMITED, Kawasaki-shi, Kanagawa (JP)

(72) Inventors: Hiroshi Kuwabara, Suginami (JP); Iori Murakami, Yokohama (JP); Susumu Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/722,343

(22) Filed: May 27, 2015

(65) Prior Publication Data

US 2015/0373274 A1 Dec. 24, 2015

(30) Foreign Application Priority Data

Jun. 20, 2014 (JP) .................................. 2014-127230

(51) Int. Cl.
| | | |
|---|---|---|
| G09G 5/00 | (2006.01) | |
| H04N 5/232 | (2006.01) | |
| G06K 9/00 | (2006.01) | |
| G06K 9/32 | (2006.01) | |
| G06T 19/00 | (2011.01) | |

(52) U.S. Cl.
CPC ..... *H04N 5/23293* (2013.01); *G06K 9/00671* (2013.01); *G06K 9/3216* (2013.01); *G06T 19/006* (2013.01); *H04N 5/23258* (2013.01)

(58) Field of Classification Search
CPC ....... G06T 19/006; G06T 19/00; G06F 3/011; G06F 3/012; G02B 27/017
USPC ........................................................ 345/633
See application file for complete search history.

(56) References Cited

U.S. PATENT DOCUMENTS

| 2004/0046779 A1 | 3/2004 | Asano et al. |
| 2011/0098056 A1 | 4/2011 | Rhoads et al. |
| 2011/0304648 A1 | 12/2011 | Kim et al. |
| (Continued) | | |

FOREIGN PATENT DOCUMENTS

| JP | 2000-222576 | 8/2000 |
| JP | 2002-092647 | 3/2002 |
| (Continued) | | |

OTHER PUBLICATIONS

Extended European Search Report issued Oct. 26, 2015 in Patent Application No. 15170465.7.

(Continued)

*Primary Examiner* — Ke Xiao
*Assistant Examiner* — Gordon Liu
(74) *Attorney, Agent, or Firm* — Oblon, McClelland, Maier & Neustadt, L.L.P.

(57) ABSTRACT

A display device includes circuitry configured to: selectively execute a first control and a second control, the first control performing both a capture process by an image capturing device and an image recognition process which detects specific object from an image captured by the image capturing device, and the second control performing the capture process from among the capture process and the image recognition device, and display a content corresponding to the specific object on the image during an execution of the first control when the specific object is detected from the image in the image recognition process during the execution of the first control.

20 Claims, 20 Drawing Sheets

(56) References Cited

U.S. PATENT DOCUMENTS

| | | |
|---|---|---|
| 2012/0165046 A1 | 6/2012 | Rhoads et al. |
| 2013/0083221 A1 | 4/2013 | Horii |
| 2013/0128060 A1 | 5/2013 | Rhoads et al. |
| 2013/0148849 A1 | 6/2013 | Nakai et al. |
| 2013/0246949 A1* | 9/2013 | Kikuchi ............... G06F 3/0484 715/765 |
| 2013/0294648 A1 | 11/2013 | Rhoads et al. |
| 2013/0324161 A1 | 12/2013 | Rhoads et al. |
| 2014/0368541 A1* | 12/2014 | Sakurai ............... G09G 5/377 345/633 |
| 2015/0024800 A1 | 1/2015 | Rodriguez et al. |
| 2015/0178555 A1* | 6/2015 | Feng ............... G06K 9/00335 382/103 |
| 2015/0244850 A1 | 8/2015 | Rodriguez et al. |
| 2015/0286289 A1 | 10/2015 | Lee |

FOREIGN PATENT DOCUMENTS

| | | |
|---|---|---|
| JP | 2004-048674 | 2/2004 |
| JP | 2011-253324 | 12/2011 |
| JP | 2013-120502 | 6/2013 |
| WO | WO 2014/058234 A1 | 4/2014 |

OTHER PUBLICATIONS

Erich Bruns, et al., "Enabling Mobile Phones to Support Large-Scale Museum Guidance" IEEE MultiMedia, vol. 14, No. 2, XP011265810, Apr. 2007, pp. 16-25.

Hirokazu Kato et al. "An Augmented Reality System and its Calibration Based on Marker Tracking" Virtual Reality Society of Japan, vol. 4, No. 4, 1999, 10 pages (with English Abstract).

* cited by examiner

FIG. 6

$$T = \begin{bmatrix} r11 & r12 & r13 & X1c \\ r21 & r22 & r23 & Y1c \\ r31 & r32 & r33 & Z1c \\ 0 & 0 & 0 & 1 \end{bmatrix}$$

$$R = \begin{bmatrix} r11 & r12 & r13 \\ r21 & r22 & r23 \\ r31 & r32 & r33 \end{bmatrix}$$

FIG. 7

$$R1 = \begin{bmatrix} 1 & 0 & 0 \\ 0 & \cos P1c & -\sin P1c \\ 0 & \sin P1c & \cos P1c \end{bmatrix}$$

$$R2 = \begin{bmatrix} \cos Q1c & 0 & \sin Q1c \\ 0 & 1 & 0 \\ -\sin Q1c & 0 & \cos Q1c \end{bmatrix}$$

$$R3 = \begin{bmatrix} \cos R1c & -\sin R1c & 0 \\ \sin R1c & \cos R1c & 0 \\ 0 & 0 & 1 \end{bmatrix}$$

FIG. 8

| AR CONTENT ID | Xm | Ym | Zm | Pm | Qm | Rm | Jx | Jy | Jz | TEMPLATE ID | MARKER ID | ADDITIONAL INFORMATION |
|---|---|---|---|---|---|---|---|---|---|---|---|---|
| C1 | Xm1 | Ym1 | Zm1 | Pm1 | Qm1 | Rm1 | Jx1 | Jy1 | Jz1 | T1 | M1 | CHECK THAT THE VALVE IS CLOSED |
| C2 | Xm2 | Ym2 | Zm2 | Pm2 | Qm2 | Rm2 | Jx2 | Jy2 | Jz2 | T3 | M1 | |
| | | | | | | | | | | | | |

FIG. 9

| TEMPLATE ID | | T1 |
|---|---|---|
| VERTEX COORDINATES | 0 | (0, 0, 0) |
| | 1 | (X3m, Y3m, Z3m) |
| | 2 | (X4m, Y4m, Z4m) |
| | 3 | (X5m, Y5m, Z5m) |
| | 4 | (X6m, Y6m, Z6m) |
| | 5 | ... |
| | 6 | ... |
| | 7 | ... |
| | ... | ... |
| 1 | VERTEX ORDER | 1, 3, 4, 5, 7 |
| | TEXTURE ID | 21 |
| 2 | VERTEX ORDER | 2, 3, 4, 5, 6 |
| | TEXTURE ID | 21 |
| ... | VERTEX ORDER | ... |
| | TEXTURE ID | ... |

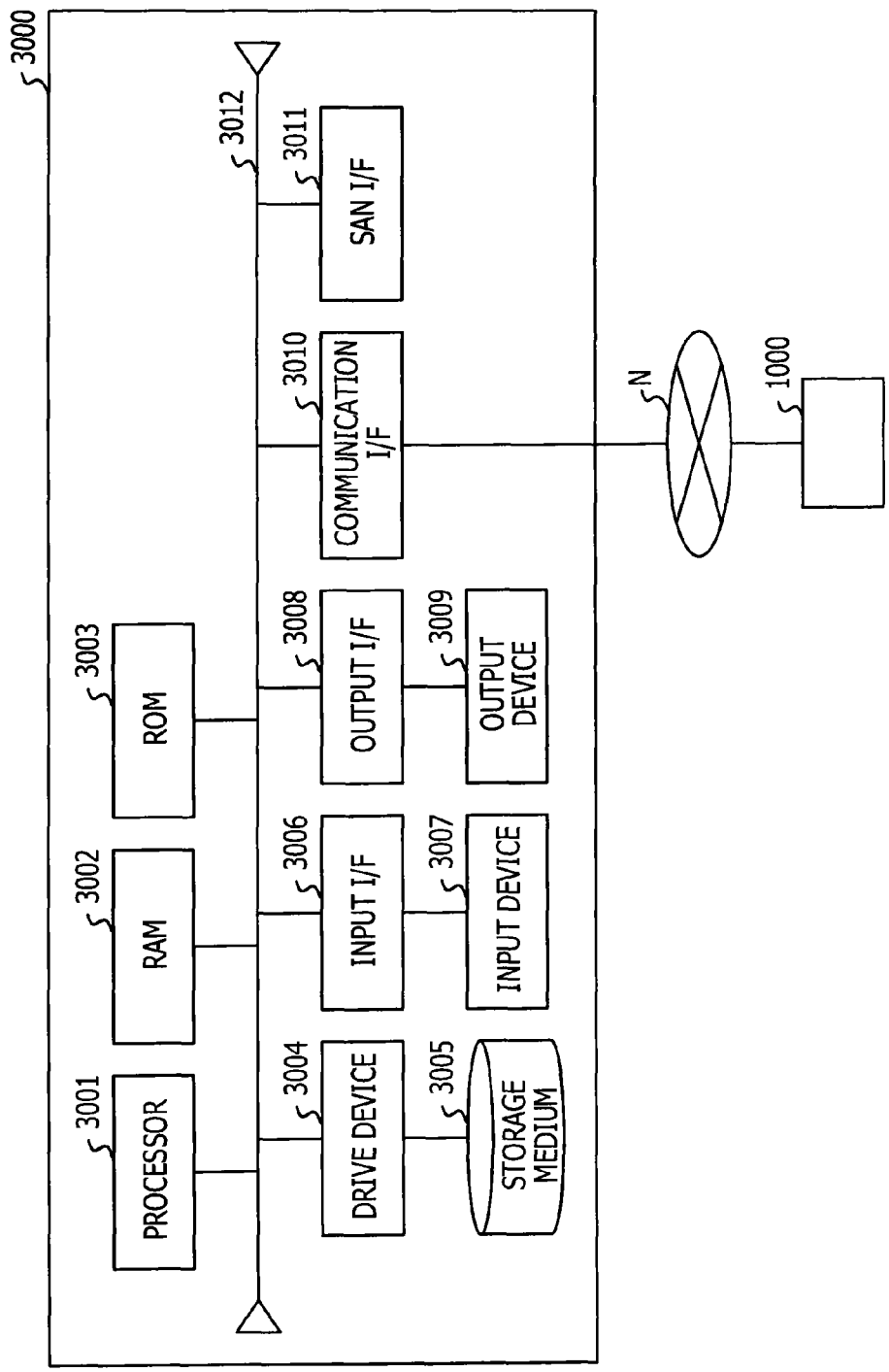

DISPLAY DEVICE AND CONTROL METHOD

CROSS-REFERENCE TO RELATED APPLICATION

This application is based upon and claims the benefit of priority from the prior Japanese Patent Application No. 2014-127230, filed on Jun. 20, 2014, the entire contents of which are incorporated herein by reference.

FIELD

The embodiments discussed herein are related to technology in which image data is superimposed on other image data and displayed.

BACKGROUND

Augmented reality (AR) technology is known in which, when displaying an image which is obtained by capturing the real world on a display, by displaying content which is not present in the real world superimposed on the image which is displayed on the display, a composite image in which the content appears to be present in the real world is provided. Hereinafter, the content will be referred to as AR content.

A user viewing the composite image may acquire information which is displayed as AR content, and may ascertain more information in comparison with a case in which the real world is observed directly. Note that, due to the shape, color, or the like of the AR content itself, the AR content may be image data which causes the recollection of a characteristic meaning, image data containing textual data, or the like.

AR includes technology referred to as location-based AR and technology referred to as vision-based AR. In location-based AR, positional information and information relating to the direction of a camera-equipped terminal is acquired from a GPS sensor or the like, and the AR content to be displayed in a superimposed manner, the position at which to display the AR content in a superimposed manner, and the like are determined according to the positional information, the information relating to the direction, and the like. The AR content is displayed superimposed on the image which is captured by the camera.

In vision-based AR, the image data which is acquired from the camera is subjected to object recognition and spatial recognition. In vision-based AR, when it is recognized that the image data is the data of an image in which a specific object is captured, AR content corresponding to the specific object is displayed in a superimposed manner according to the result of the spatial recognition (for example, patent literature 1 and patent literature 2). Note that, it is referred to as marker-type vision-based AR when a marker is used as a recognition target, and it is referred to as markerless-type vision-based AR when an object other than a marker is used as the recognition target.

Here, description will be given of an outline of the process flow in vision-based AR technology of the related art. FIG. 1 is a diagram illustrating an outline of the process flow in vision-based AR technology of the related art. Note that, an AR processing program of the related art is installed on a computer, and the vision-based AR of the related art is realized by the computer executing the AR processing program.

The computer activates the AR processing program according to input from a user or the like (Op. 100). The following AR processes are executed by the computer activating and executing the AR processing program. The computer which is executing the AR processing program transmits a camera activation command to the application which controls the camera in order to capture an image of the processing target (Op. 101). Accordingly, the camera is activated, and the capture process which is performed by the camera is started.

Next, the computer acquires the image data from the camera (Op. 102). By executing the image recognition, the computer determines whether a specific object is contained in the acquired image data (Op. 103). When the marker-type vision-based AR is used, it is determined whether image data indicating a marker is contained in the captured image data.

When the specific object is contained in the image data (yes in Op. 103), the computer executes a process for displaying AR content according to the specific object to be superimposed on the image data (Op. 104). For example, as described above, the position at which to superimpose the AR content is determined according to the results of the object recognition and the spatial recognition, and the AR content is displayed to be superimposed in the determined position. Note that, when the specific object is not contained in the image data (no in Op. 103), the process proceeds to Op. 105 without executing Op. 104.

The computer determines whether or not to end the AR processing program (Op. 105). When the AR processing program is not ended (no in Op. 105), the processes of Op. 102 onward are repeated. Meanwhile, when the AR processing program is ended (yes in Op. 105), the computer stops the capture process which is performed by the camera by transmitting a camera stop command to the application which controls the camera (Op. 106). The computer ends the AR processing program (Op. 107). These techniques are disclosed in Japanese Laid-open Patent Publication No. 2002-092647, and Japanese Laid-open Patent Publication No. 2004-048674, for example.

SUMMARY

According to an aspect of the invention, a display device includes circuitry configured to: selectively execute a first control and a second control, the first control performing both a capture process by an image capturing device and an image recognition process which detects specific object from an image captured by the image capturing device, and the second control performing the capture process from among the capture process and the image recognition device, and display a content corresponding to the specific object on the image during an execution of the first control when the specific object is detected from the image in the image recognition process during the execution of the first control.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates a transformation matrix and a rotation matrix from the marker coordinate system to the camera coordinate system;

FIG. 7 illustrates rotation matrices R1, R2, and R3;

FIG. 8 is a configuration example of a data table in which AR content information is stored;

FIG. 9 is a configuration example of a data table in which template information is stored;

FIG. 20 is a hardware configuration example of a management device.

DESCRIPTION OF EMBODIMENTS

Figure 1:
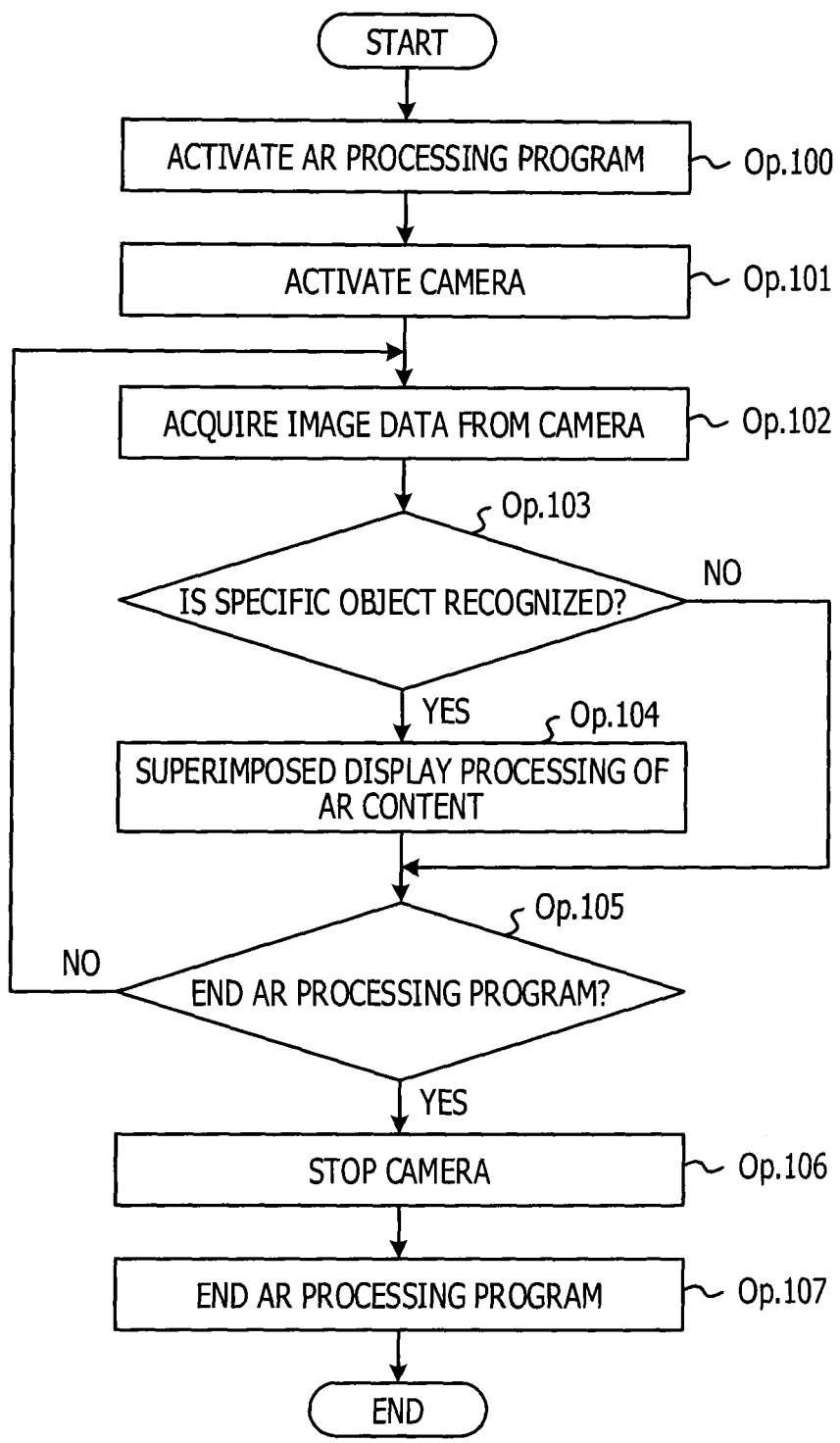
FIG. 1 is a diagram illustrating an outline of the process flow in vision-based AR technology of the related art.

In the processes which use the computer in the related art, there is demand for a reduction in the power consumption and processing load, and this also applies to AR technology. Here, as illustrated using FIG. 1, in the vision-based AR technology of the related art, when the image data is acquired from the camera, the image recognition process is executed using the image data as input data. Therefore, according to an aspect of the disclosure, an image recognition process is focused on, and an object is to reduce the power consumption and processing load in vision-based AR.

Hereinafter, description will be given of the embodiments. Note that, the examples described hereinafter may be combined, as appropriate, in so far as to not to contradict the content of the processes.

Description will be given using a marker-type vision-based AR, which uses a marker, as an example. However, the technology disclosed in the examples may also be applied to markerless-type vision-based AR. When the technology disclosed herein is applied to the markerless-type vision-based AR, in the image recognition process, a dictionary which defines the shape of a recognition target is prepared in advance, and the image recognition process is executed on the image data using the dictionary.

FIRST EXAMPLE

In the first example, it is controlled as to whether or not to execute the image recognition process while the capture process is being executed by the camera. For example, in the first example, a first mode in which the image data which is captured by a capture process is input to the image recognition process while the capture process is being executed by the camera, and a second mode in which the image data which is captured by the capture process is not subjected to the image recognition process while the capture process is being executed by the camera.

Figure 2:
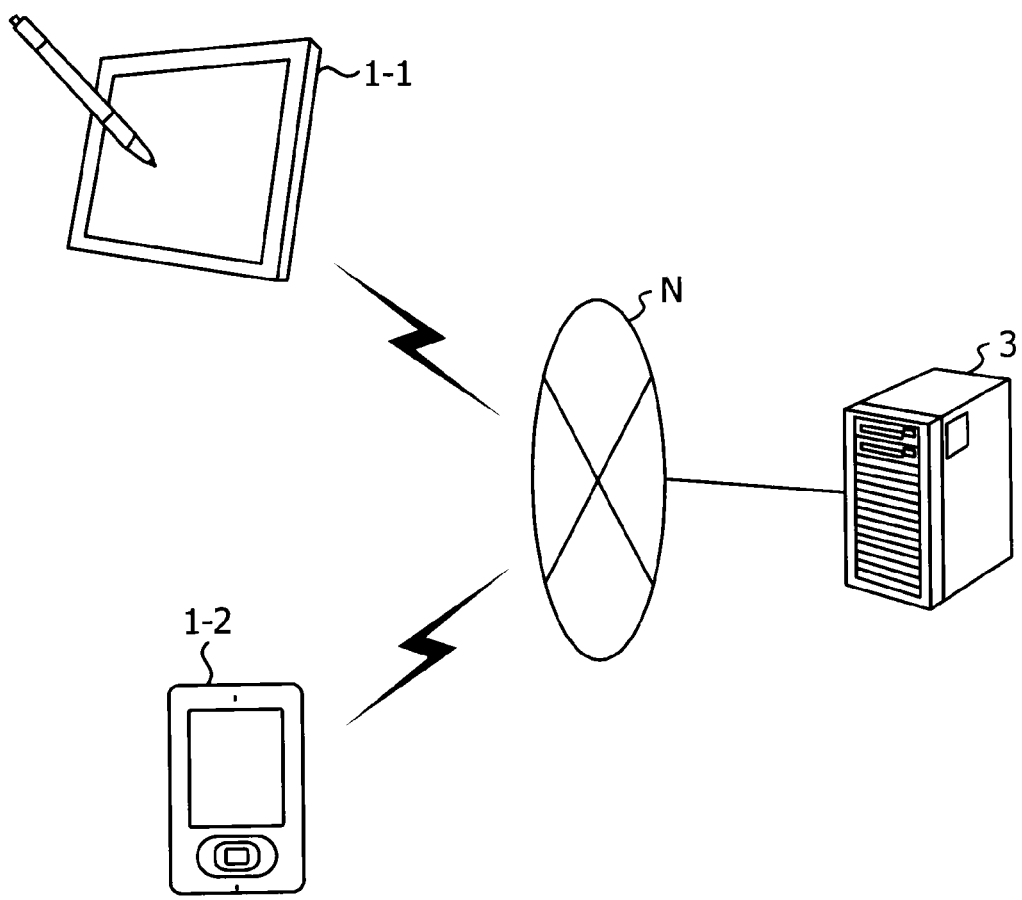
FIG. 2 is a system configuration example according to a first example.

FIG. 2 is a system configuration example according to a first example. In the example of FIG. 2, a communication terminal 1-1 and a communication terminal 1-2 are illustrated as examples of the display device which performs AR display. Hereinafter, the communication terminals 1-1 and 1-2 will be referred to collectively as a display device 1.

The display device 1 communicates with a management device 3 via a network N. The display device 1 according to the present example is a computer which realizes vision-based AR. The system according to the present example includes the display device 1 and the management device 3.

The display device 1 is a device which includes, for example, a camera and a display, and includes a processor (circuit), such as a tablet computer or a smart phone. A camera is an example of the image capturing device. The management device 3 is a server computer, for example, and manages the display device 1. The network N is the Internet, for example.

The display device 1 suppresses the execution of the image recognition process, which has a high CPU use rate, by controlling the execution of a mode which executes the image recognition process which detects specific image data from the image data which is acquired by a camera, and a mode which does not subject the image data to the image recognition process. The display device 1 controls the mode to be executed according to the state of the display device 1, for example.

The above is based on the following discoveries and observations made by the inventors. The inventors deduced that the image recognition process is a large cause of power consumption in the vision-based AR which performs processes such as those in FIG. 1. According to the observations of the inventors, it is understood that the CPU use rate caused by the image recognition process is from 40% to 50%, for example. The display device 1 according to the present example executes the image recognition process, when desired, by controlling the execution of the image recognition process. Accordingly, savings in power consumption and a reduction in the processing load are achieved.

As a result of executing the image recognition process, when the specific image data is detected in the image data which is acquired from the camera, the display device 1 superimposes other image data which corresponds to the specific image data on the image data and displays the result. The image data is the image data which is captured by the camera, the specific image data is the image data of a marker, for example, and the other image data is the image data of the AR content.

The management device 3 stores the AR content information and the template information, and, as desired, provides the information to the display device 1. The AR content information is information relating to the AR content information of the target on which to perform AR display. The template information is information in which the shape, pattern, and the like of a template are defined when the AR content is generated using a template. Detailed description will be given later.

In the present example, the display device 1 acquires the AR content information and the template information from the management device 3 before performing the AR display.

The management device 3 stores the AR content information relating to a plurality of AR content, and the template information relating to a plurality of templates; however, only the AR content information and the template information relating to a portion of the AR content or the templates may be provided to the display device 1. For example, the management device 3 may provide only the AR content which is likely to be provided to the user according to properties of the user operating the display device 1, and the templates relating to the AR content to the display device 1.

Figure 3:
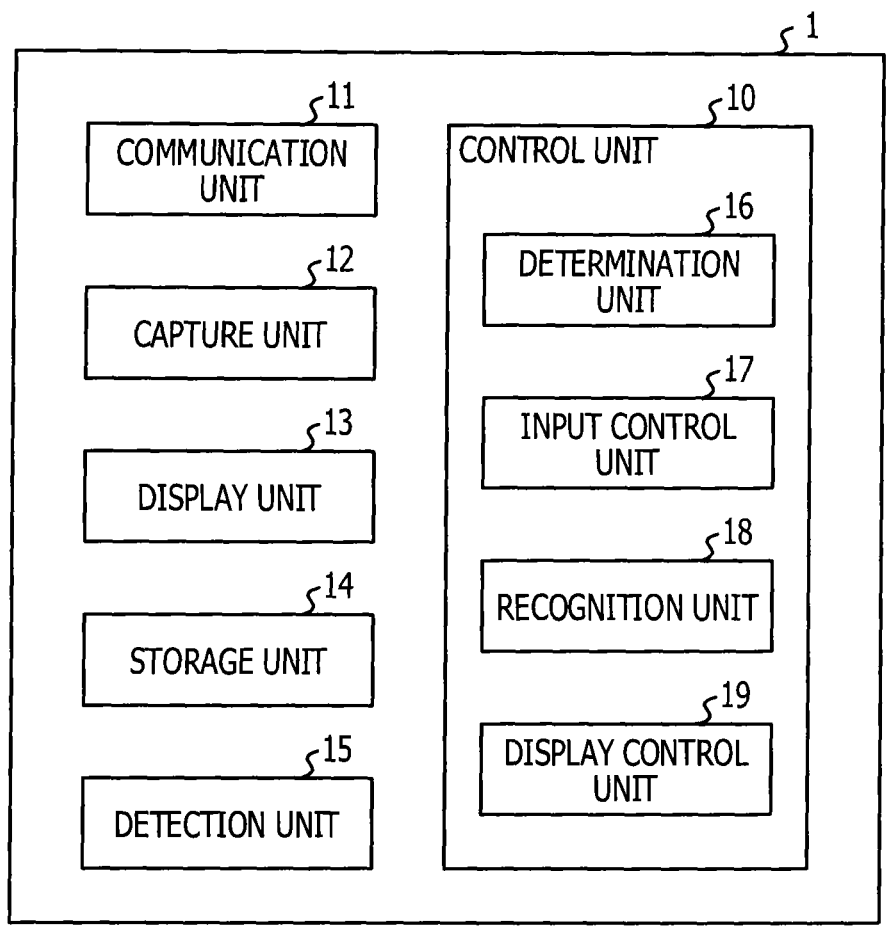
FIG. 3 is a functional block diagram of a display device according to the first example.

FIG. 3 is a functional block diagram of a display device according to the first example. The display device 1 includes a control unit 10, a communication unit 11, a capture unit 12, a display unit 13, a storage unit 14, and a detection unit 15. As described above, the display device 1 illustrated in FIG. 3 is an example of the communication terminal 1-1 and the communication terminal 1-2 illustrated in FIG. 2.

The communication unit 11 performs communication with another computer. For example, the communication unit 11 receives the AR content information and the template information from the management device 3. The capture unit 12 performs capturing at a fixed frame interval and generates the image data. The capture unit 12 inputs the image data to the control unit 10. The starting and ending of the capture process which are performed by the capture unit 12 are controlled by the control unit 10. For example, the capture unit 12 is the camera described above.

The display unit 13 displays various images. The various images include, camera images, and a composite image in which the AR content is superimposed on the camera image. Note that, the camera image is an image corresponding to the image data which is acquired from the capture unit 12. The storage unit 14 stores various information under the control of the control unit 10. The storage unit 14 stores the AR content information and the template information. Note that, the storage unit 14 may temporarily store the image data which is acquired from the capture unit 11 under the control of the control unit 10.

The detection unit 15 detects information from which it is possible to estimate the state of the display device 1. The information which is detected by the detection unit 15 is referred to as a detected value. The detected value which is detected by the detection unit 15 is input to the control unit 10. For example, in the present example, the detection unit 15 detects acceleration, from which it is possible to detect the movement state of the display device 1, as the detected value.

The acceleration is detected for each of three axial directions which are set in relation to the display device 1. For example, the horizontal and vertical directions of the display unit 13 (the display) of the display device 1 are set as an X axis and a Y axis, and the depth direction of the display is set as a Z axis.

The control unit 10 controls various processes of the entire display device 1. For example, the control unit 10 controls the capture process which is performed by the capture unit 12, the display process which is performed by the display unit 13, the detection process which is performed by the detection unit 15, and the storage process of information to the storage unit 14.

The control unit 10 controls the execution of a first mode and a second mode. The first mode executes the image recognition process, which detects the specific image data, in relation to the image data which is captured by the capture unit 12, and the second mode does not execute the image recognition process in relation to the image data which is input from the capture unit 12. When the control unit 10 detects that the image recognition process is executed and the specific image data is included in the input image data, the control unit 10 performs a display control process for superimposing the AR content on the image data.

Hereinafter, detailed description will be given of the processes of the control unit 10. The control unit 10 includes a determination unit 16, an input control unit 17, a recognition unit 18, and a display control unit 19.

The determination unit 16 acquires the detected value from the detection unit 15 and determines the movement state of the display device 1 based on the detected value. The movement state includes, for example, a state in which the display device 1 is moving, and a state in which the display device 1 is not moving. The movement state is managed using a flag "True (1)" indicating that the display device 1 is moving, and a flag "False (0)" indicating that the display device 1 is not moving.

The flag which is set by the determination unit 16 is used as a mode setting value which controls the input process of the image data which is performed by the input control unit 17 described later. For example, if the flag is "True (1)", the second mode is set. Meanwhile, if the flag is "False (0)", the first mode is set.

In the present example, the movement state is determined based on whether or not the difference between the detected value at a certain time and the detected value which is detected prior thereto is greater than or equal to a threshold which is set in advance. When the difference is smaller than the threshold, it is determined that the display device 1 is in a non-moving state. For example, the threshold is 3.0 m/s$^2$.

In this manner, the "state in which the display device 1 is not moving" in the present example does not typically indicate that the display device 1 is completely static. Note that, the movement state may be determined using a comparison between the detected value and the threshold instead of a comparison between a change amount of the detected value and the threshold.

Next, the input control unit 17 determines whether to input the image data which is input from the capture unit 12 to the recognition unit 18 (described later) using a flag (a mode setting value), and performs the input to the recognition unit 18 according to the determination result. Note that, when the image data which is input from the capture unit 12 is stored temporarily in the storage unit 14, when the second mode is set, the input control unit 17 acquires the image data from the storage unit 14 and inputs the image data to the recognition unit 18.

For example, if the mode is the first mode (the flag "False (0)"), the input control unit 17 determines that it has to execute the image recognition process, and inputs the image data to the recognition unit 18. Meanwhile, if the mode is the second mode (the flag "True (1)"), the input control unit 17 determines that it does not have to execute the image recognition process, and does not input the image data to the recognition unit 18. Note that, when the second mode is set, the input control unit 17 transmits a command to the display control unit 19 so as to display the image data as it is on the display unit 13; however, the image data may be discarded without being displayed on the display unit 13.

When the image data is input from the input control unit 17, the recognition unit 18 performs the image recognition process using the image data as a target.

Specifically, in the marker-type vision-based AR, the recognition unit 18 determines whether the image data of a marker is included in the input image data using the object recognition template which defines the shape of the marker.

When the recognition unit 18 determines that the image data of the marker is contained in the input image data, the recognition unit 18 generates region information indicating the region of the marker in the input image data. For example, the region information is formed of coordinate values of four vertices which configure the marker. The recognition unit 18 calculates the positional coordinates and the rotational coordinates of the marker as viewed from the camera based on the region information. Note that, the positional coordinates, the rotational coordinates, and the camera coordinate system of the marker will be described later.

The recognition unit 18 outputs the calculated positional coordinates and rotational coordinates to the display control unit 19. Note that, when the recognition unit 18 determines that the image data of the marker is not contained in the image data, the recognition unit 18 outputs the fact that recognition may not be possible to the display control unit 19.

When the recognition unit 18 determines that the marker is contained in the image data, identification information which identifies the marker is acquired. For example, a marker ID is acquired. For example, a unique marker ID is acquired from the disposition of white portions and black portions within the marker, in the same manner as in a two-dimensional barcode. Another known acquisition method may be applied as the method of acquiring the marker ID.

The display control unit 19 executes the display control process for performing the AR display based on the positional coordinates, the rotational coordinates, the marker ID, the AR content information, and the template information.

Here, description will be given of the display control process for performing the AR display. In the description, the positional coordinates, the rotational coordinates, the camera coordinate system, the AR content information, and the template information of the marker described earlier will also be described.

Figure 4:
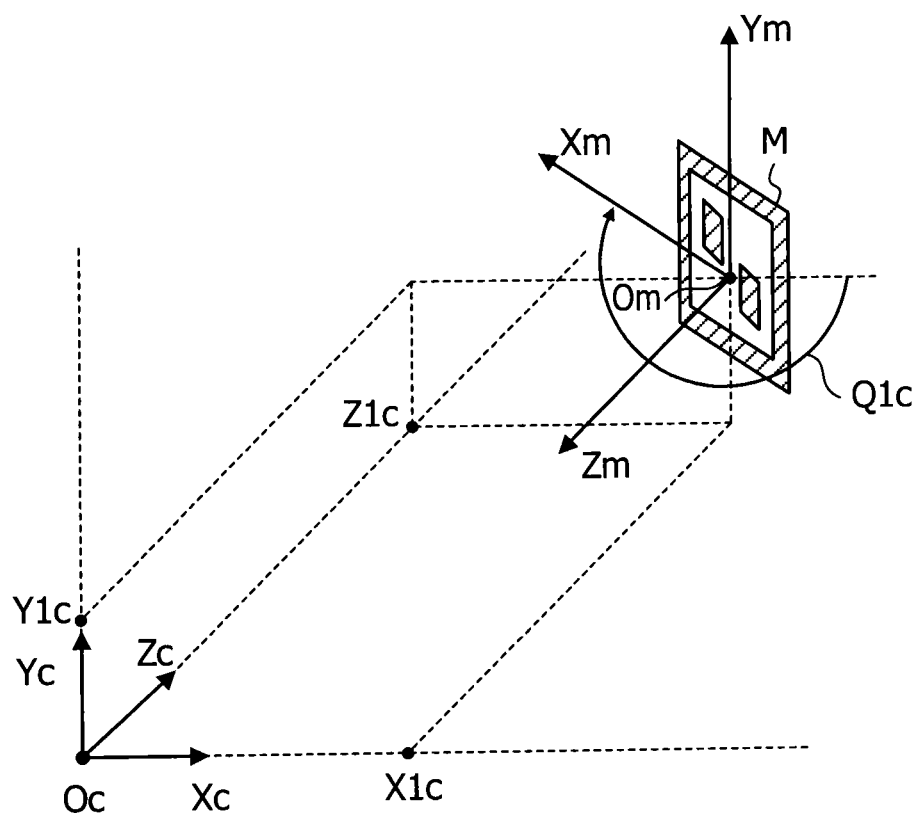
FIG. 4 is a diagram illustrating the relationship between a camera coordinate system and a marker coordinate system.

First, description will be given of the relationship between the camera coordinate system which is centered on the camera, and the marker coordinate system which is centered on a marker M. FIG. 4 is a diagram illustrating the relationship between a camera coordinate system and a marker coordinate system. Note that, the marker M is a pattern with a special shape which is printed onto paper which is attached to a wall, a ceiling, facilities or the like within a building. For example, the marker M has a regular square shape in which the length of one side is 5 cm.

In FIG. 4, the origin of the camera coordinate system is Oc (0, 0, 0). Note that, the origin Oc may be the actual focal point of the camera, and a position which differs from the focal point of the camera may be set as the origin Oc. The camera coordinate system is configured in three dimensions (Xc, Yc, Zc). An Xc-Yc plane is a surface which is parallel to a capture element surface of the camera, for example. The Zc axis is an axis which is perpendicular to the capture element surface, for example.

Next, the origin of the marker coordinate system is Om (0, 0, 0). Note that, the origin Om is the center of the marker M. The marker coordinate system is configured in three dimensions (Xm, Ym, Zm). For example, an Xm-Ym plane of the marker coordinate system is a surface which is parallel to the marker M, and the Zm axis is an axis which is perpendicular to the surface of the marker M. Note that, in the marker coordinate system, the size of one marker M in the image data is used as a unit coordinate.

Meanwhile, the origin Om of the marker coordinate system is represented at (X1c, Y1c, Z1c) in the camera coordinate system. The coordinates (X1c, Y1c, Z1c) of Om in the camera coordinate system are calculated based on the coordinate values of the four corners of the marker M from the image data which is acquired from the camera.

In other words, when a state in which the camera and the marker M directly face each other is the ideal form, the coordinates (X1c, Y1c, Z1c) of Om are calculated based on the difference between the ideal form and the actual detected state. Accordingly, a shape in which the positional relationship between the marker M and the camera may be distinguished is adopted for the shape of the marker M. The size of the marker M is also determined in advance. Accordingly, it is possible to recognize the marker M by subjecting the image data to the object recognition, and it is possible to determine the positional relationship of the marker M with the camera from the shape and the size of the image of the marker M in the image data.

Next, the rotational angle of the marker coordinate system (Xm, Ym, Zm) in relation to the camera coordinate system (Xc, Yc, Zc) is indicated by rotational coordinates G1c (P1c, Q1c, R1c). P1c is the rotational angle around the Xc axis, Q1c is the rotational angle around the Yc axis, and R1c is the rotational angle around the Zc axis. In the marker coordinate system exemplified in FIG. 4, since there is only rotation around the Ym axis, P1c and R1c are 0. Note that, each rotational angle is calculated based on a comparison between the known marker M shape and the shape of the image of the marker M in the captured image.

The calculation method of the coordinates (X1c, Y1c, Z1c) of Om and the rotational coordinates G1c (P1c, Q1c, R1c) in the camera coordinate system may use the method disclosed in KATO, Hirokazu et. al: "An Augmented Reality System and its Calibration based on Marker Tracking", *Transactions of the Virtual Reality Society of Japan (TVRSJ)*, vol. 4, no. 4, 1999, for example.

Figure 5:
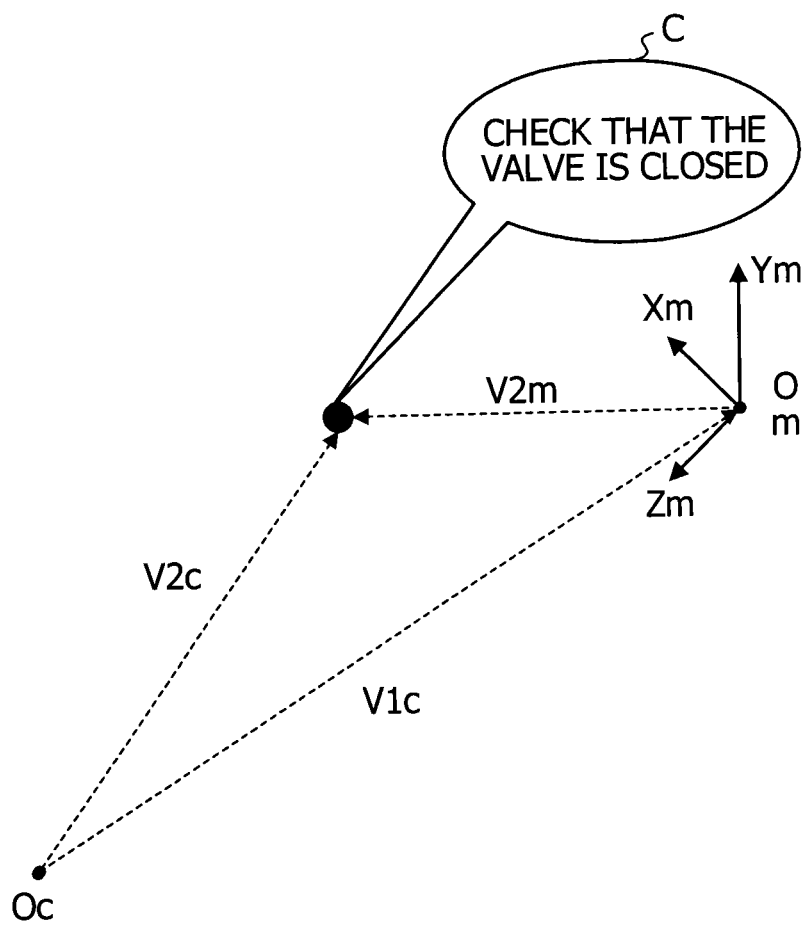
FIG. 5 illustrates an example of AR content.

FIG. 5 illustrates an example of AR content. Ar content C illustrated in FIG. 5 is the image data with a speech-bubble shape, and contains the textual information "check that the valve is closed" within the speech-bubble. The positional information and the rotational information are set in the AR content C relative to the marker M in advance. In other words, the positional information and the rotational information of the AR content are set in the marker coordinate system.

Here, detailed description will be given of the positional information and the rotational information. The black circle in front of the AR content C in FIG. 5 is a reference point V2m (X2m, Y2m, Z2m) of the AR content C. The orientation of the AR content C is defined by the rotational coordinates G2m (P2m, Q2m, R2m), and the size of the AR content C is defined by a scaling factor D (Jx, Jy, Jz). Note that, the rotational coordinates G2m of the AR content C indicate the degree of rotational state at which the AR content is disposed in relation to the marker coordinate system. For example, although different from the example of FIG. 5, when G2m is (0, 0, 0), the AR content is subjected to AR display parallel to the marker M.

Next, the shape of the AR content C is set by the coordinates of each point forming the AR content C, other than the reference point, also being set individually relative to the reference point. In the present example, the shape of the AR content C is described by reusing a template which is created in advance. In other words, the coordinates of each point forming the AR content C are defined in the template of the shape of the AR content C. However, in the template, the reference point is set to the coordinates (0, 0, 0), and each point other than the reference point is defined as a relative value to the coordinates of the reference point. Accordingly, when the reference point V2m of the AR content C is set, the coordinates of each point forming the template are subjected to parallel translation based on the coordinates of the reference point V2m.

The coordinates of each point contained in the template are rotated based on the set rotational coordinates G2m, and the distance between adjacent points is expanded or contracted by the scaling factor D. In other words, the AR content C of FIG. 5 illustrates a state in which each point which is defined in the template is configured based on a point which is adjusted based on the coordinates of the reference point V2m, the rotational coordinates G2m, and the scaling factor D.

As described above, the disposition of the AR content in relation to the marker M is determined based on the positional information and the rotational information of the AR content. Accordingly, when the user captures the marker M using the camera, the display device 1 is capable of generating the image data representing the image of the AR content when it is assumed that the camera captures the AR content for which the disposition relative to the marker M is determined. In other words, by rendering the AR content based on the generated image data, when the rendered AR content is overlaid on the camera image which is captured by the camera, a composite image is obtained in which an object which is visible in the camera image and the AR content appear to correspond to each other.

Next, a more detailed description will be given of the process in the course of generating the image data which represents the image of the AR content. A process in which the coordinates of each point which is defined in the marker coordinate system are transformed to the camera coordinate system, and a process in which each point which is transformed to the camera coordinate system is projected onto a display plane in order to render the points on the display. Hereinafter, description will be given of each transformation process.

FIG. 6 illustrates a transformation matrix T and a rotation matrix R from the marker coordinate system to the camera coordinate system. The transformation matrix T is a determinant for transforming each point of the AR content which is defined in the marker coordinate system, from the marker coordinate system to the camera coordinate system, based on the coordinate values (X1c, Y1c, Z1c) in the camera coordinate system of Om which serves as the origin of the marker coordinate system, and the rotational coordinates G1c (P1c, Q1c, R1c) of the marker coordinate system in relation to the camera coordinate system.

The transformation matrix T is a 4×4 matrix. The column vector (Xc, Yc, Zc, 1) relating to the coordinates Vc corresponding to the camera coordinate system may be obtained from the product of the transformation matrix T and the column vector (Xm, Ym, Zm, 1) relating to the coordinates Vm of the marker coordinate system.

A rotational operation for matching the orientation of the marker coordinate system with the orientation of the camera coordinate system is performed by a partial matrix (the rotation matrix R) formed of rows 1 to 3 and columns 1 to 3 of the transformation matrix T acting on the coordinates of the marker coordinate system. A translation operation for matching the position of the marker coordinate system with the position of the camera coordinate system is performed by a partial matrix formed of rows 1 to 3 and column 4 of the transformation matrix T acting on the coordinates of the marker coordinate system.

FIG. 7 illustrates rotation matrices R1, R2, and R3. Note that, the rotation matrix R illustrated in FIG. 6 is calculated by obtaining the product (R1·R2·R3) of the rotation matrices R1, R2, and R3. The rotation matrix R1 illustrates the rotation of the Xm axis in relation to the Xc axis. The rotation matrix R2 illustrates the rotation of the Ym axis in relation to the Yc axis. The rotation matrix R3 illustrates the rotation of the Zm axis in relation to the Zc axis.

The rotation matrices R1, R2, and R3 are generated based on the image of the marker M within the captured image. In other words, the rotational angles P1c, Q1c, and R1c are calculated based on what type of image the marker M with the known shape is captured as in the captured image which serves as the processing target, as described earlier. The rotation matrices R1, R2, and R3 are generated based on the calculated rotational angles P1c, Q1c, and R1c.

As described above, the column vector (Xc, Yc, Zc, 1) containing the point coordinates of the camera coordinate system is obtained by assigning the point coordinates of the marker coordinate system which serves as the coordinate transformation target to the column vector (Xm, Ym, Zm, 1) and performing a matrix operation. In other words, it is possible to transform the points (Xm, Ym, Zm) of the marker coordinate system to the camera coordinate system (Xc, Yc, Zc). Note that, the coordinate transformation is also referred to as a model view transformation.

For example, as illustrated in FIG. 5, by subjecting the reference point V2m of the AR content C to the model view transformation, which point V2c (X2c, Y2c, Z2c) in the camera coordinate system corresponds to the reference point V2m which is defined in the marker coordinate system may be obtained. Using the processes described hereunto, the position of the AR content in relation to the camera (the positional relationship between the camera and the AR content) is calculated by using the marker M.

Next, the coordinates of the camera coordinate system of each point of the AR content C are transformed to the screen coordinate system. The screen coordinate system is configured in two dimensions (Xs, Ys). The image of the AR content C which is AR displayed is generated by projecting the coordinates of each point of the AR content C which are transformed to the camera coordinate system on a two-dimensional plane (Xs, Ys) which serves as a virtual screen. In other words, a portion of the screen coordinate system corresponds to the display screen of the display. Note that, transforming the coordinates of the camera coordinate system to the screen coordinate system is referred to as perspective transformation.

The virtual screen which serves as a projection surface is set to be parallel to the Xc-Yc plane of the camera coordinate system and is set at a predetermined distance in the Zc direction, for example. At this time, when the origin Oc (0, 0, 0) in the camera coordinate system is set at a fixed distance in the Zc direction from the focal point of the camera, the origin (0, 0) in the screen coordinate system also corresponds to a point on the optical axis of the camera.

The perspective transformation is performed based on a focal length f of the camera, for example. The Xs coordinate of the coordinates of the screen coordinate system which corresponds to the coordinates (Xc, Yc, Zc) in the camera coordinate system is obtained using the following equation 1. The Ys coordinate of the coordinates of the screen coordinate system which corresponds to the coordinates (Xc, Yc, Zc) in the camera coordinate system is obtained using the following equation 2.

$$Xs = f \cdot Xc/Zc \quad \text{(Equation 1)}$$

$$Ys = f \cdot Yc/Zc \quad \text{(Equation 2)}$$

The image of the AR content C is generated based on the coordinate values of the screen coordinate system which are obtained using the perspective transformation. The AR content C is generated by mapping a texture to a surface which is obtained by interpolating a plurality of points which form the AR content C. The template which forms the basis of the AR content C defines which points to interpolate to form the surface, and which texture to map to which surface.

Next, description will be given of the AR content information and the template information. FIG. 8 is a configuration example of a data table in which AR content information is stored. The AR content information contains at least the AR content ID, the positional information, and the rotational information. The AR content information further contains the scaling factor information, the template ID, the marker ID, and additional information.

The AR content ID, positional information and the rotational information of the AR content in the marker coordinate system are associated with each other and stored in a data table. The AR content ID is identification information which uniquely identifies the AR content. The positional information is information for specifying the position of the AR content in relation to the marker M, and is, for example, the positional coordinates (Xm, Ym, Zm) of the reference point which form the AR content in the marker coordinate system. The rotational information is information for specifying the rotation of the AR content in relation to the marker M, and is the rotational coordinates (Pm, Qm, Rm) of the AR content in relation to the marker coordinate system, for example. The positional information and the rotational information are information for determining the disposition of the AR content.

When the model shape of the AR content is created using a template, the template ID and the scaling factor information are stored in the data table. The template ID is identification information which identifies the template to be applied to the AR content. The scaling factor information is information of the scaling factor D when applying the template as the AR content, and is the scaling factor (Jx, Jy, Jz) for expanding or contracting each of the axial directions, for example.

When the AR content information for which to perform the AR display is switched according to the identification information of the marker M which is recognized, the marker ID of the marker M which is associated with each item of AR content are stored in the data table. Note that, even with the same marker M, depending on the property information of the user, when the AR content for which to perform the AR display is switched, information which identifies the properties of the user is also stored in the data table for each item of AR content according to the marker ID.

The additional information may be further stored in the data table. The textual information which is rendered within the AR content is stored as the additional information, for example. In the example of the AR content ID "C1" of FIG. 8, the text "check that the valve is closed" is rendered within the AR content.

FIG. 9 is a configuration example of a data table in which template information is stored. The template information includes the identification information of the template (the template ID), coordinate information of each vertex which forms the template, and configuration information of each surface which forms the template (vertex order and specification of the texture ID).

The vertex order indicates the order of the vertices which form a surface. The texture ID indicates the identification information of the texture to map to the surface. The reference point of the template is the 0-th vertex, for example. The shape and pattern of the three-dimensional model are defined by the information indicated in the template information table.

As described above, the AR content ID of the AR content which the display control unit 19 is to perform AR display according to the marker ID which is acquired from the recognition unit 18. The display control unit 19 generates the transformation matrix T using the positional coordinates and the rotational coordinates which are calculated by the recognition unit 18.

The display control unit 19 subjects the coordinates of each point of the AR content to coordinate transformation from the marker coordinate system to the camera coordinate system using the AR content information of the specified AR content, the template information of the template ID which is set in the AR content information, and the transformation matrix T. The display control unit 19 generates the image data for superimposing the AR content by transforming the camera coordinate system to the screen coordinate system using equation 1 and equation 2 described above.

The display control unit 19 overlays the image data for superimposing on the image data which is acquired from the camera, and, by causing the display unit 13 to display the result, a composite image in which the camera image and the AR content are composited is displayed on the display unit 13.

Figure 10:
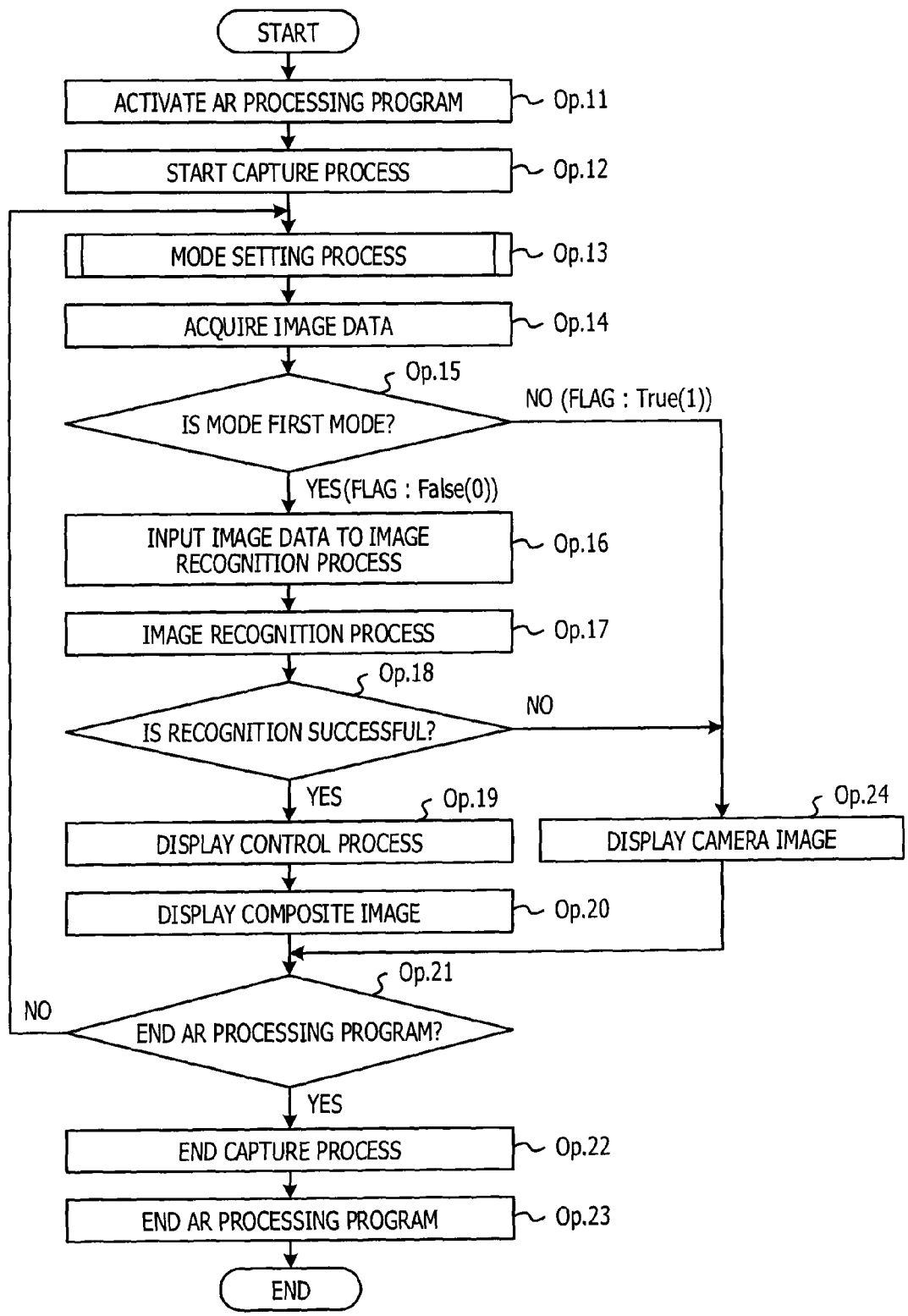
FIG. 10 is a process flow of a control method according to the first example.

From hereon, description will be given of the flow of the processes which are performed by the display device 1. FIG. 10 is a process flow of a control method according to the first example. Note that, the series of AR processes including the control process illustrated below are executed by a computer which functions as the display device 1 activating and executing the AR processing program.

The control unit 10 activates the AR processing program (Op. 11). The following processes are executed by the control unit 10 executing the AR processing program. Note that, when the AR processing program is activated, the template information and the AR content information are acquired from the management device 3. The control unit 10 orders the capture unit 12 to start the capture process (Op. 12).

When the capture unit 12 receives instructions to capture from the control unit 10, the capture unit 12 acquires the image data which is generated by the capture element at a predetermined time interval and stores the image data in the storage unit 14. The storage unit 14 is provided with a buffer which stores a plurality of items of the image data, and the image data is stored in the buffer. Display of the camera image corresponding to the image data is started under the control of the control unit 10. Here, the display unit 13 displays the camera image in real time, and, when the display control process is executed by the display control unit 19, the display unit 13 displays the composite image.

Next, the determination unit 16 performs the mode setting process (Op. 13). The mode setting process is a process for determining the movement state of the display device 1 and controlling the input of the image data to the recognition unit 18 by the input control unit 17 according to the movement state.

Figure 11:
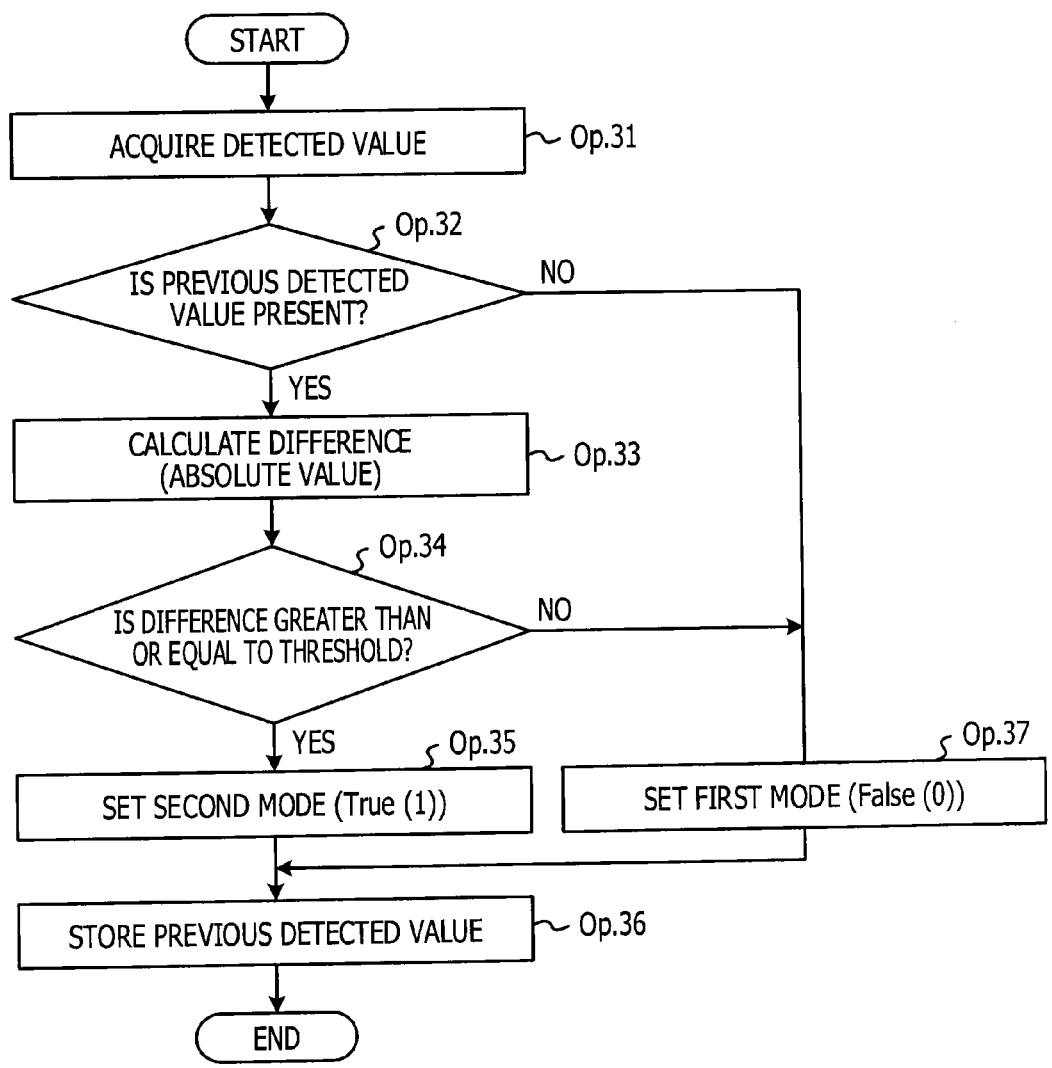
FIG. 11 is a detailed process flow of a mode setting process.

FIG. 11 is a detailed process flow of a mode setting process. The determination unit 16 acquires the detected value from the detection unit 15 (Op. 31). Note that, as described earlier, the detected value is the acceleration which is detected for each direction of three axes (or two axes) which are set in advance, for example.

The determination unit 16 determines whether or not data of the detected value which is acquired the previous time is present (Op. 32). For example, when the detected value is first acquired such as when the AR processing program is activated, the determination unit 16 determines that the data of the detected value which is acquired the previous time is absent (no in Op. 32). Meanwhile, when the detected value which is acquired the previous time is present (yes in Op. 32), the determination unit 16 calculates the absolute value of the difference between the detected value which is acquired the previous time and the detected value which is acquired the present time (Op. 33).

Next, the determination unit 16 determines whether or not the difference is greater than or equal to a threshold which is set in advance (Op. 34). When the difference is greater than or equal to the threshold (yes in Op. 34), since it is estimated that the display device 1 is in the moving state, the determination unit 16 sets the second mode (the mode in which the image recognition process is not executed) (Op. 35). Note that, the flag for managing the mode is set to True (1).

Meanwhile, when the difference is less than the threshold (no in Op. 34), since it is estimated that the display device 1 is in the non-moving state, the determination unit 16 sets the first mode (the mode in which the image recognition process is executed) (Op. 37). Note that, the flag for managing the mode is set to False (0).

Next, the determination unit 16 stores (or updates) the detected value which is acquired in Op. 31 in the storage unit 14 in order to use the detected value in the mode setting process of the next time onward (Op. 36). Note that, when the determination unit 16 determines that the data of the detected value which is acquired the previous time is absent (no in Op. 32), the determination unit 16 executes Op. 37 and Op. 36. Finally, the determination unit 16 ends the series of mode setting processes.

When the mode setting process is ended, the input control unit 17 acquires the image data from the storage unit 14 (Op. 14). The input control unit 17 checks the mode which is set and determines whether the mode is the first mode (Op. 15). In other words, the input control unit 17 determines whether or not the flag is False (0).

When the first mode is set (yes in Op. 15), that is, when the flag is False (0), the input control unit 17 inputs the image data to the recognition unit 18 (Op. 16). The recognition unit 18 executes the image recognition process (Op. 17). Note that, the image recognition process is a process which detects the specific image data from the input image data. In the present example, in the image recognition process, when the specific image data is detected, the recognition unit 18 calculates the positional coordinates and the rotational coordinates (the camera coordinate system) of the object (the marker M) which corresponds to the specific image data, and extracts the marker ID.

Next, the control unit 10 determines whether or not the image recognition is successful (Op. 18). In other words, the control unit 10 determines whether or not the specific image data (the marker M) is detected from the image data. When the image recognition is successful (yes in Op. 18), since the image recognition result is input to the display control unit 19, the display control unit 19 executes the display control process (Op. 19). Specifically, in the display control process, the model view transformation is performed based on the AR content information, the template information, and the transformation matrix T, and the perspective transformation is performed based on equations 1 and 2.

The display unit 13 displays the composite image under the control of the display control unit 19 (Op. 20). In other words, the display unit 13 may superimpose the other image data (the AR content) on the image data (the camera image) at a specific position and display the result. Accordingly, the user may view a composite image in which the AR content is superimposed on the other object which is in a specific positional relationship with the marker M in real space and the result thereof is displayed.

As a result of executing the image recognition process, when the recognition fails (no in Op. 18), that is, when the specific image data may not be detected, the display unit 13 displays the camera image under the control of the control unit 10 (Op. 24). In other words, the image data which is acquired in Op. 14 is displayed on the display unit 13 as it is.

When the first mode is set (no in Op. 15), that is, when the flag is True (1) and the second mode is set, the display unit 13 displays the camera image under the control of the control unit 10 without the input control unit 17 inputting the image data to the recognition unit 18 (Op. 24). In other words, the image recognition process (Op. 17) is not executed.

When the specific image data is not recognized by the image recognition process in this manner, since the display control process (Op. 19) is not executed, the camera image is displayed on the display unit 13. In other words, the composite image is not displayed, and the rendering process relating to the AR content when displaying an image on the display unit 13 may not be desired. Different rendering process methods of the control unit 10 may be used in executing the display process of the composite image (Op. 20), and the display process of the camera image (Op. 24). For example, in the rendering process of the composite image, the control unit 10 uses an application programming interface (API) specialized for graphics such as OpenGL. Meanwhile, in the rendering process of the camera image, the control unit 10 uses an application UI rendering API such as that provided by the application execution platform of the OS.

The control unit 10 determines whether or not to end the AR processing program (Op. 21). For example, when there is input from the user indicating that the AR processing program is to be ended, the control unit 10 performs an ending process of the AR processing program. When the AR processing program is not ended (no in Op. 21), the processes of Op. 13 onward are repeated.

Meanwhile, when the AR processing program is ended (yes in Op. 21), the capture unit 12 ends the capture process due to the control unit 10 commanding the capture unit 12 to end the capture process (Op. 22). The control unit 10 ends the AR processing program (Op. 23).

Figure 12:
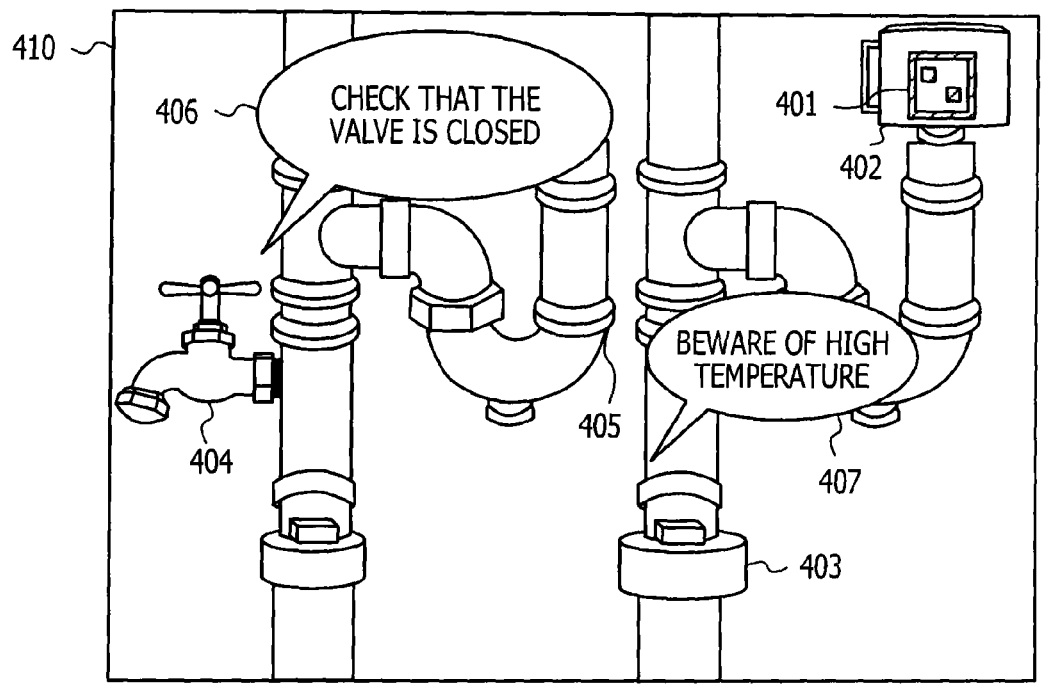
FIG. 12 depicts a composite image.

Next, description will be given of the composite image. FIG. 12 is depicts a composite image. AR content 406 and AR content 407 are displayed in a composite image 410 which is displayed on the display unit 13. Meanwhile, a marker 401, a tank 402, a pipe 403, a valve 404, and a piper 405 are objects which are present in real space, and are visible in the camera image. Note that, in the example of FIG. 12, since two items of AR content are associated, in advance, with the one marker 401, two items of AR content are superimposed and displayed in the composite image. Note that, as in FIG. 12, the marker 401 is attached to the tank 402.

According to the image recognition process and the display control process, the AR content 406 and the AR content 407 are both displayed in a superimposed manner in positions maintaining a predetermined positional relationship with the marker 401. As a result, in the composite image 410, the AR content 406 is displayed in the vicinity of the valve 404 which is in a first positional relationship with the marker 401, and the AR content 407 is displayed in the vicinity of the pipe 403 which is in a second positional relationship with the marker 401. Accordingly, the user which views the composite image 410 may easily ascertain that the AR content 406 is a work instruction in relation to the valve 404, and that the AR content 407 is a warning item in relation to the pipe 403.

As described above, according to the first example, it is possible to control the execution of the image recognition process by the recognition unit 18. In other words, the image recognition process which is performed by the recognition unit 18 is stopped by not performing the input of the image data to the recognition unit 18 depending on the state of the display device 1. Accordingly, the processing load is reduced. By controlling the execution of the image recognition process which has a high CPU use rate, it is possible to obtain a reduction in the power consumption of the display device 1.

In the present example, since the capture process which is performed by the capture unit 12 continues, the camera image is displayed on the display unit 13 in real time. The user may check the camera image without being conscious of the fact that the image recognition process and the display control process are stopped internally, and perform work which may be desired.

MODIFICATION EXAMPLE OF FIRST EXAMPLE

In the first example, the first mode and the second mode are set according to the movement state of the display device 1; however, the mode may be set according to another state of the display device 1. For example, the first mode may be set if the display device 1 is in a state of being present in a specific location, and the second mode may be set if the display device 1 is in a state of being present in a location other than the specific location. For example, the location in which the display device 1 is present is specified by Global Positioning System (GPS), or iBeacon.

As yet another example, the second mode may be set if a state is assumed in which the user performs input which releases the execution of the image recognition process in relation to the display device 1, and the first mode may be set in other cases.

The setting of the threshold which is used in the process of Op. 34 may be changed at an appropriate time. For example, in the example described above, description is given with the assumption that a threshold for determining the movement state is set as the threshold for controlling the execution of the image recognition process. However, a threshold with which it is possible to determine another state may be set as the threshold for controlling the execution of the image recognition process. In this case, under the control of the control unit 10, the display unit 13 displays an input screen which a user uses for inputting the threshold, and the threshold which is input by the user may be used in the determination process (Op. 34) which is performed later by the determination unit 16.

For example, the second mode is set when the user is walking whilst holding the display device 1. Meanwhile, if the user is in a movement-stopped state, and is in a state of slowly varying the capture range of the camera while holding the display device 1 and searching for a capture direction of the camera in which the marker M is contained within the capture range of the camera (the display device is in the movement state while the user is not in the walking state), the first mode is set. In this manner, the display device 1 according to the modification example may accept adjustments to the threshold.

In addition, information which is acquired from other sensors may be used in the switching from the first mode to the second mode. For example, when it is estimated that a human may not desire the display of the AR content C such as when it is detected that the eyes of a human are closed, and when brain waves of a human exhibit inactivity, the switching to the second mode is performed. For example, when the image data may not be appropriate for the image recognition process such as when a luminance less than or equal to a threshold is detected, the switching to the second mode is performed.

SECOND EXAMPLE

In the second example, finer execution control of the processes is performed in comparison with the first example with the aim of saving more power. For example, in the first example, a process which detects the specific image data, a process which calculates the positional coordinates and the rotational coordinates, and a process which acquires the marker ID are included in the image recognition process. Meanwhile, in the second example, only the process which detects the specific image data, and the process which calculates the positional coordinates and the rotational coordinates are included in the image recognition process, and the process which acquires the marker ID is treated as a separate ID acquisition process. In the second example, the execution of the image recognition process and the execution of the ID acquisition process are controlled separately.

Since the system configuration relating to the second example and that relating to the first example are the same, description thereof will be omitted. Next, description will be given of the functional configuration of the display device according to the second example. Note that, the example of the communication terminal 1-1 and the communication terminal 1-2 in the system configuration example (FIG. 2) is a display device 2 which is described hereinafter.

Figure 13:
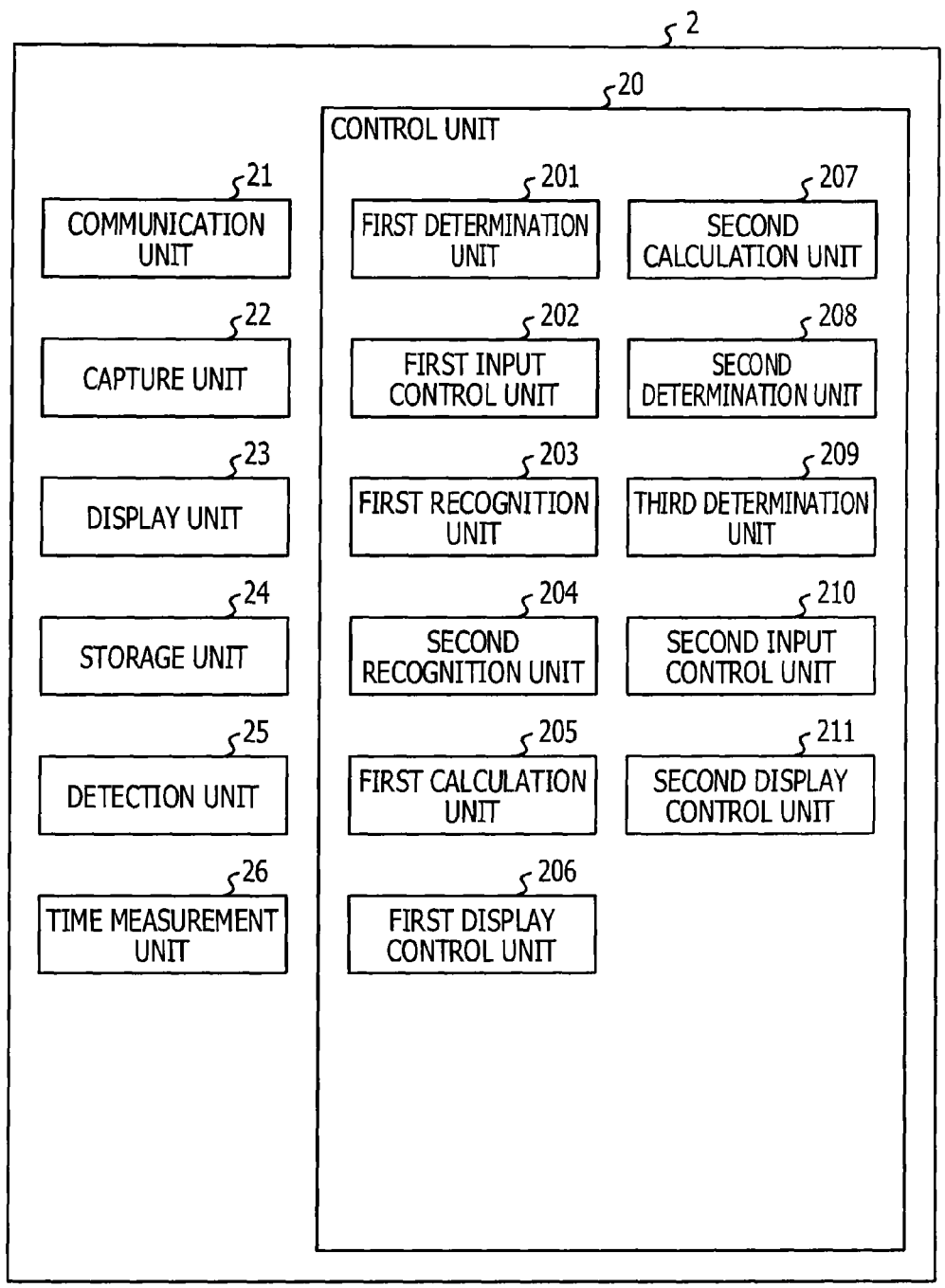
FIG. 13 is a functional block diagram of a display device according to a second example.

FIG. 13 is a functional block diagram of a display device according to a second example. The display device 2 includes a control unit 20, a communication unit 21, a capture unit 22, a display unit 23, a storage unit 24, a detection unit 25, and a time measurement unit 26.

Under the control of the control unit 20, the communication unit 21, the capture unit 22, the display unit 23, the storage unit 24, and the detection unit 25 respectively perform the same processes as the communication unit 11, the capture unit 12, the display unit 13, the storage unit 14, and the detection unit 15 in the first example. Under the control of the control unit 20, the time measurement unit 26 measures the elapsed time from a timing at which the control unit 20 issues an activation command. For example, the time measurement unit 26 is a timer.

The control unit 20 controls various processes of the entire display device 2. For example, the control unit 20 controls the capture process which is performed by the capture unit 22, the display process which is performed by the display unit 23, the storage of information to the storage unit 24, the detection process which is performed by the detection unit 25, and the time measurement process which is performed by the time measurement unit 26.

Hereinafter, detailed description will be given of the processes of the control unit 20. The control unit 20 includes a first determination unit 201, a first input control unit 202, a first recognition unit 203, a second recognition unit 204, a first calculation unit 205, a first display control unit 206, a second calculation unit 207, a second determination unit 208, a third determination unit 209, a second input control unit 210, and a second display control unit 211.

The first determination unit 201 determines that the image data is to be acquired based on the detected value which is input from the detection unit 25. For example, the first determination unit 201 determines whether or not to start the capture process which is performed by the capture unit 22 based on the detected value which is input from the detection unit 25. When the capture process is started, the first determination unit 201 acquires the image data from the storage unit 24. After the starting of the capture process, the first determination unit 201 receives input indicating the completion of a focusing process from the capture unit 22 and may determine that the image data is to be acquired. Note that, determining that the image data is to be acquired in the present example is equivalent to the setting of the first mode (the mode which executes the image processing) in the first example.

When the mode in which the image recognition process is performed is set, the first input control unit 202 inputs the image data to the first recognition unit 203 which performs the image recognition process. For example, the first input control unit 202 acquires the image data from the storage unit 24 based on the determination results obtained by the first determination unit 201, or the determination results obtained by the second determination unit 208 (described later), and inputs the image data to the first recognition unit 203.

The first recognition unit 203 is a processing unit which subjects the image data which is input from the first input control unit 202 or the second input control unit 210 (described later) to the image recognition process. Note that, the image recognition process in the present example is a process which detects the specific image data from the input image data, and which calculates the positional coordinates and the rotational coordinates indicating the positional relationship between the camera and the marker M when the specific image data is detected.

The second recognition unit 204 is a processing unit which performs the ID acquisition process after the image recognition process which is performed by the first recognition unit 203 is ended when the first input control unit 202 inputs the image data to the first recognition unit 203. The ID acquisition process in the present example is a process which extracts the marker ID from the input image data. Note that, when the second input control unit 210 inputs the image data to the first recognition unit 203, the ID acquisition process which is performed by the second recognition unit 204 is not executed. This is because, as described later, the premise is to reuse the marker ID which is acquired in the past, and a reduction in the calculation amount is obtained by not executing the ID acquisition process.

The first calculation unit 205 calculates the marker position in the camera image based on the results of the image recognition which is performed by the first recognition unit 203. The first calculation unit 205 calculates a threshold T2 indicating the distance between the marker M and the display region of the display unit 13 using the marker position which is calculates from the results of the image recognition which is performed by the first recognition unit 203. The threshold T2 is a threshold for determining whether the marker M is present within the display range of the display unit 13. In other words, the threshold T2 is a threshold for determining whether the movement from the position of the marker M in the image data which is captured at a certain time occurs within the screen. Detailed description will be given later.

The first calculation unit 205 calculates a threshold T3 which is used in the determination process which is performed by the third determination unit 209 (described later). The threshold T3 is a threshold for determining whether or not the movement amount is minute, even when the movement of the marker M is intra-screen movement. In the present example, when the first recognition unit 203 recognizes the marker M, the length of a side of a marker M1 (in pixels) is set as the threshold T3.

Figure 14:
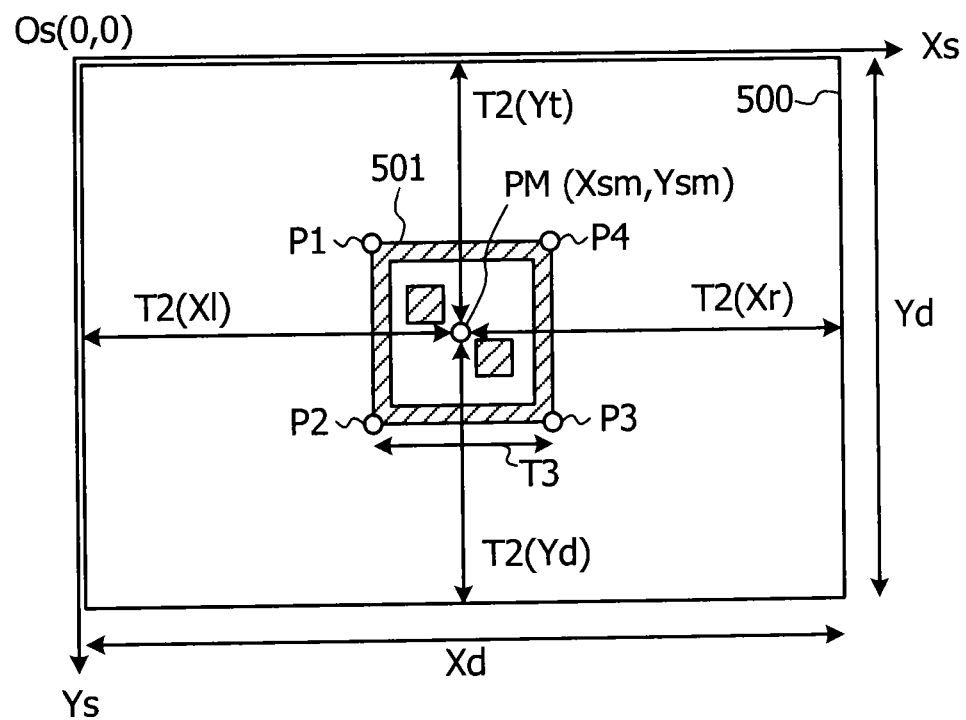
FIG. 14 is a diagram for illustrating the calculation methods of a marker position and various thresholds.

Here, description will be given of an example of the calculation methods of the marker position, the threshold T2, and the threshold T3 performed by the first calculation unit 205. FIG. 14 is a diagram for illustrating the calculation methods of a marker position and various thresholds. FIG. 14 exemplifies a state in which a camera image in which a display region 500 in the display unit 13 contains a marker 501.

As illustrated in FIG. 14, in the display region 500 of the display unit 13, the top left is set to an origin Os (O, O), rightward in the horizontal direction is set to a positive direction of the Xs axis, and downward in the vertical direction is set to the positive direction of the Ys axis. The number of pixels arranged in the Xs direction of the display region 500 is set to Xd (pixels), and the number of pixels arranged in the Ys direction is set to Yd (pixels).

In the same manner as in the first example, when the marker M image is recognized by the image recognition process, the region information indicating the marker M region (the coordinates of the four vertices forming the marker M) is input to the first calculation unit 205 from the first recognition unit 203. In FIG. 14, the coordinate values of the four points P1, P2, P3, and P4 are input to the first calculation unit 205 as the region information.

In the present example, the center point of the marker M which is represented by the intersection point of a straight line P1-P3 and a straight line P2-P4 is set as a marker position PM (Xsm, Ysm). The first calculation unit 205 obtains the marker position PM (Xsm, Ysm) from the coordinate values of the four points P1, P2, P3, and P4.

Next, the first calculation unit 205 calculates the threshold T2 indicating the degree of margin that is present from the marker position PM to each side of the display region 500. As illustrated in FIG. 14, the number of pixels from the marker position PM to each side forming the display region 500 is the threshold T2 (T2 (Xl), T2 (Xr), T2 (Yd), T2 (Yt)). Note that, T2 (Xl), T2 (Xr), T2 (Yd), and T2 (Yt) are calculated using the respective equations below.

$$T2(Xl)=Xsm \qquad \text{(Equation 3)}$$

$$T2(Xr)=Xd-Xsm \qquad \text{(Equation 4)}$$

$$T2(Yt)=Ysm \qquad \text{(Equation 5)}$$

$$T2(Yd)=Yd-Ysm \qquad \text{(Equation 6)}$$

Next, the first calculation unit 205 obtains the threshold T3. In the present example, of the four vertices which form the marker M, the distance between two adjacent points (the length of the side of the marker M1) is set to the threshold T3. For example, the first calculation unit 205 obtains the distance between P2 and P3 and sets the distance as the threshold T3.

Returning to FIG. 13, the first display control unit 206 performs the display control process based on the results of the image recognition which is performed by the first recognition unit 203. For example, in a similar manner to the display control unit 19 in the first example, the first display control unit 206 acquires the AR content information and the template information from the storage unit 24 based on the result of the ID acquisition (the marker ID) which is performed by the second recognition unit 204. The first display control unit 206 performs the model view transformation using the positional coordinates and the rotational coordinates which are input from the first recognition unit 203, and performs the perspective transformation using equation 1 and equation 2. The display control unit 206 controls the display unit 23 to display the composite image in which the AR content is superimposed on the camera image.

Next, the second calculation unit 207 estimates the movement amount of the marker position PM using the detected value which is input from the detection unit 25 without using the results of the image recognition process which is performed by the first recognition unit 203. Since the second calculation unit 207 is capable of estimating the marker position PM using the detected value, it is possible to omit the image recognition process which is performed by the first recognition unit 203 and has a high processing load. The movement amount which is calculated by the second calculation unit 207 is used for determining whether or not to execute the image recognition process in relation to the new image data.

For example, the second calculation unit 207 calculates movement amounts $X_{MA}$ and $Y_{MA}$ with the following equation using the detected value (an acceleration a) which is input from the detection unit 25 and an elapsed time t which is measured by the time measurement unit 26. Note that, $X_{MA}$ is the movement amount of the marker position PM in the Xs direction, and $Y_{MA}$ is the movement amount of the marker position PM in the Ys direction.

$$X_{MA} = \frac{1}{2}a_x t^2 + v_x t \quad v_x = \int a_x dt \quad \text{(Equation 7)}$$

$$Y_{MA} = \frac{1}{2}a_y t^2 + v_y t \quad v_y = \int a_y dt \quad \text{(Equation 8)}$$

Note that, the detection unit 25 detects the acceleration (ax, ay, az) for each direction of the three axes (X, Y, Z) which are set in advance in relation to the display device 2, in the same manner as in the first example. When, of the three axes which are set in advance in relation to the display device 2, the X axis matches the Xs axis and the Y axis matches the Ys axis, of the accelerations (ax, ay, az) detected by the detection unit 25, the second calculation unit 207 uses ax as the acceleration in the Xs axial direction, and ay as the acceleration in the Ys axial direction. Meanwhile, when the Xs axial direction and the Ys axial direction in the screen do not match the three axes which are set in advance in relation to the display device 2, each of the accelerations (ax, ay, az) which is detected by the detection unit 25 is divided into the Xs axial direction and the Ys axial direction according to the divergence (angle) between the X axis and the Xs axis. Note that, in the present example, description is given with the assumption that the X axis matches the Xs axis, and the Y axis matches the Ys axis.

Next, the second determination unit 208 determines whether the movement of the marker M is intra-screen movement using the movement amounts $X_{MA}$ and $Y_{MA}$ of the marker and the threshold T2. In other words, the second determination unit 208 determines whether the marker M itself has vanished from the display region 500 by determining whether or not the movement amount is less than or equal to the threshold T2.

For example, when $X_{MA}$ is a negative value, the second determination unit 208 determines whether the absolute value of $X_{MA}$ satisfies a condition 1 "less than or equal to T2 (Xl)". When $X_{MA}$ is a positive value, the second determination unit 208 determines whether $X_{MA}$ satisfies a condition 2 "less than or equal to T2 (Xr)".

When $Y_{MA}$ is a negative value, the second determination unit 208 determines whether the absolute value of $Y_{MA}$ satisfies a condition 3 "less than or equal to T2 (Yt)". When $Y_{MA}$ is a positive value, the second determination unit 208 determines whether $Y_{MA}$ satisfies a condition 4 "less than or equal to T2 (Yd)".

The movement of the marker M is determined to be intra-screen movement only when both the determination results for $X_{MA}$ and $Y_{MA}$ are affirmative. When the determination result of either $X_{MA}$ or $Y_{MA}$ is negative, the movement of the marker M is determined to be extra-screen movement.

The second determination unit 208 controls the first mode (the mode which executes the image recognition process) and the second mode (the mode which does not execute the image recognition process) according to the determination results. For example, when the movement of the marker M is determined to be intra-screen movement, the second determination unit 208 sets the second mode. Note that, hereinafter, after setting the second mode, depending on the determination results, the first mode may be restored. Meanwhile, when the movement of the marker M is determined to be extra-screen movement, the second determination unit 208 continues the first mode. In other words, new image data is acquired and the image recognition process is executed.

In this manner, if the movement of the marker M is extra-screen movement, it may be inappropriate to reuse the results of the image recognition process in relation to the past image data. Therefore, the display device 2 acquires the new image data, and determines whether the marker M is visible in the image data. When the marker M is visible, the positional coordinates and the rotational coordinates of the new marker M are calculated. Meanwhile, if the movement of the marker M is intra-screen movement, it is possible to reuse the results of the image recognition process in relation to the past image data and to continue to display the composite image. It is possible to reduce the load of the image recognition process by reusing the results of the image recognition process in relation to the past image data.

Next, in the present example, the display device 2 may include the third determination unit 209 in addition to the second determination unit 208. When the second determination unit 208 determines that the movement of the marker M is intra-screen movement (the second mode is set), the third determination unit 209 further determines whether the movement is a minute movement. For example, the third determination unit 209 compares the absolute values of the movement amounts $X_{MA}$ and $Y_{MA}$ of the marker with the threshold T3. When both the absolute values of the movement amounts $X_{MA}$ and $Y_{MA}$ of the marker are smaller than the threshold T3, the movement of the marker M is determined to be a minute movement.

After determining that the movement is not minute, the third determination unit 209 may further determine whether the movement is a swift movement. For example, the third determination unit 209 determines whether the detected value (the acceleration) which is already acquired is greater than or equal to a threshold T4 which is set in advance. If the detected value is greater than or equal to the threshold T4, the movement is determined to be a swift movement. Note that, the threshold T4 is 3.0 m/s², for example.

For example, when the movement is not minute and the movement is swift, the third determination unit 209 sets the first mode which executes the image recognition process. In other words, the third determination unit 209 commands the second input control unit 210 (described later) to input the new image data to the first recognition unit 203. Meanwhile, when the movement is minute, or when the movement is not minute and the movement is not a swift movement, the third determination unit 209 commands the second input control unit 210 (described later) to perform the display control process which reuses the results of the past image recognition process.

The second input control unit 210 acquires the new image data from the storage unit 24 and controls which processing unit into which to input the image data according to the determination result of the second determination unit 208. Note that, in the present example, the determination results of the third determination unit 209 are also used, and the input of the image data is controlled.

For example, when the third determination unit 209 determines that the movement is minute, the image data is discarded. When the third determination unit 209 determines that the movement is not minute, and that the movement is not swift, the second input control unit 210 inputs the acquired image data to the second display control unit 211.

Meanwhile, when the third determination unit 209 determines that the movement is not minute, and that the movement is a swift movement, the second input control unit 210 inputs the new image data to the first recognition unit 203. Note that, at this time, the ID acquisition process may not be performed. It is possible to reduce the processing load taken by the ID acquisition process by only the image recognition process being executed by the first recognition unit 203 and by omitting the ID acquisition process which is performed by the second recognition unit 204. This is done in observation of the fact that it is possible to reuse the marker ID which is acquired in the past.

In this manner, when the movement of the marker M is a swift movement, the second input control unit 210 inputs the new image data to the first recognition unit 203 since it has to adjust the position at which the AR content is superimposed. When the new image data is input to the first recognition unit 203, since the result of the image recognition is output to the first display control unit 206, the position at which the AR content is superimposed is recalculated. Accordingly, it is possible to secure the tracking properties of the AR content. Meanwhile, when the movement of the marker M is not a swift movement, since the tracking properties are sufficiently secured by generating the composite image using the results of the past image recognition, the image data is input to the second display control unit 211 (described later), and the second display control unit 211 is caused to execute a simpler display control process.

The second display control unit 211 executes the display control process according to the determination results which are input from the third determination unit 209. For example, when the movement is not minute and is not a swift movement, the second display control unit 211 reuses the position at which the AR content is superimposed which the first display control unit 206 determines in the past using the display control process. The second display control unit 211 generates a composite image in which the AR content, the disposition of which is determined based on the result of the past image recognition process, is superimposed on the newly acquired image data. In other words, the model view transformation and the perspective transformation are not performed.

When the determination results which are input from the third determination unit 209 indicate that the movement is minute, the second display control unit 211 controls the display unit 23 to continue displaying the composite image which is displayed in the past. In other words, since the movement is minute, by continuing to display the past composite image, it is possible to achieve a reduction in the processing load without causing a user to feel uncomfortable.

Figure 15:
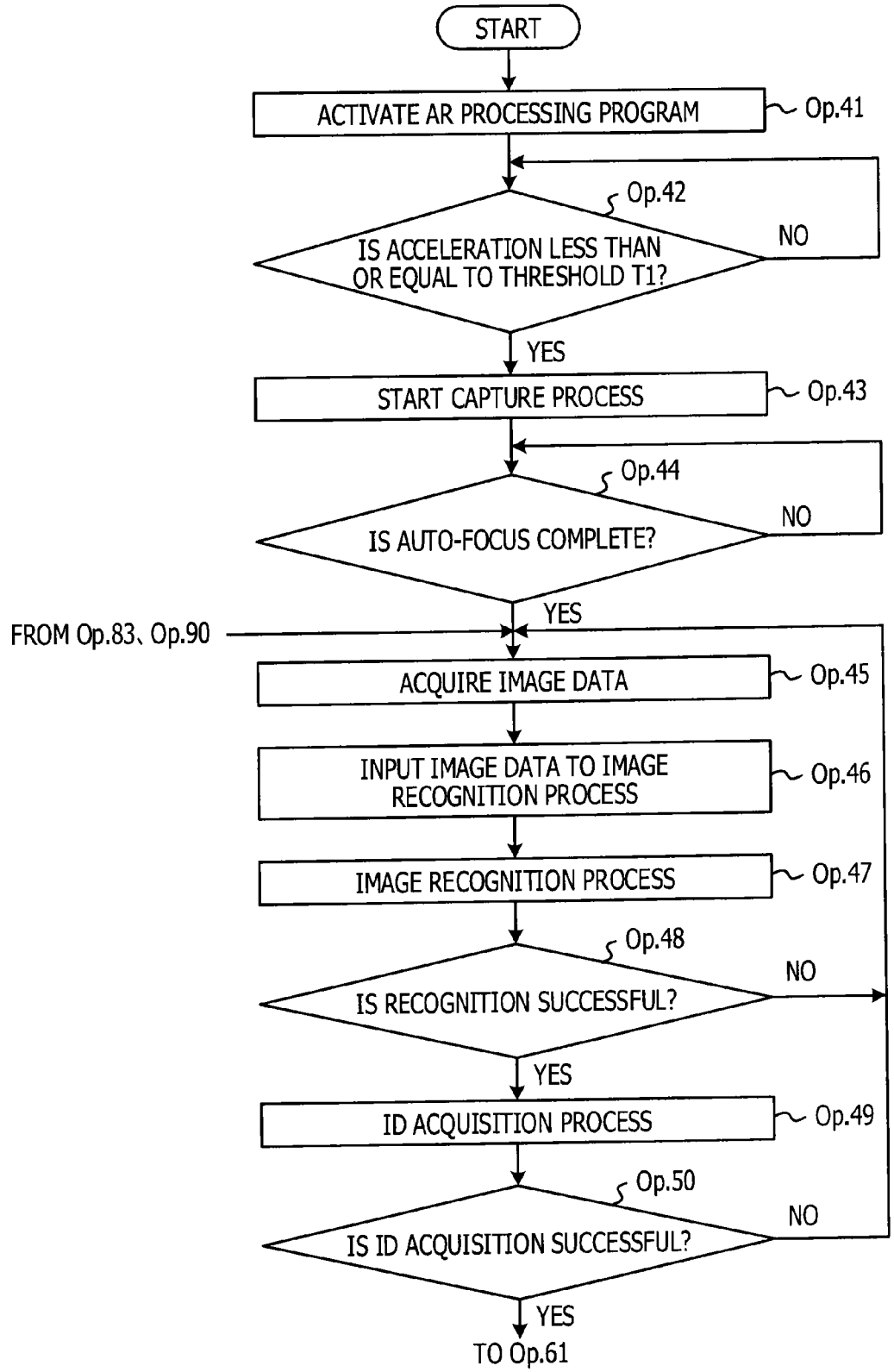
FIG. 15 is a process flow (part 1) of the control method according to the second example.
Figure 16:
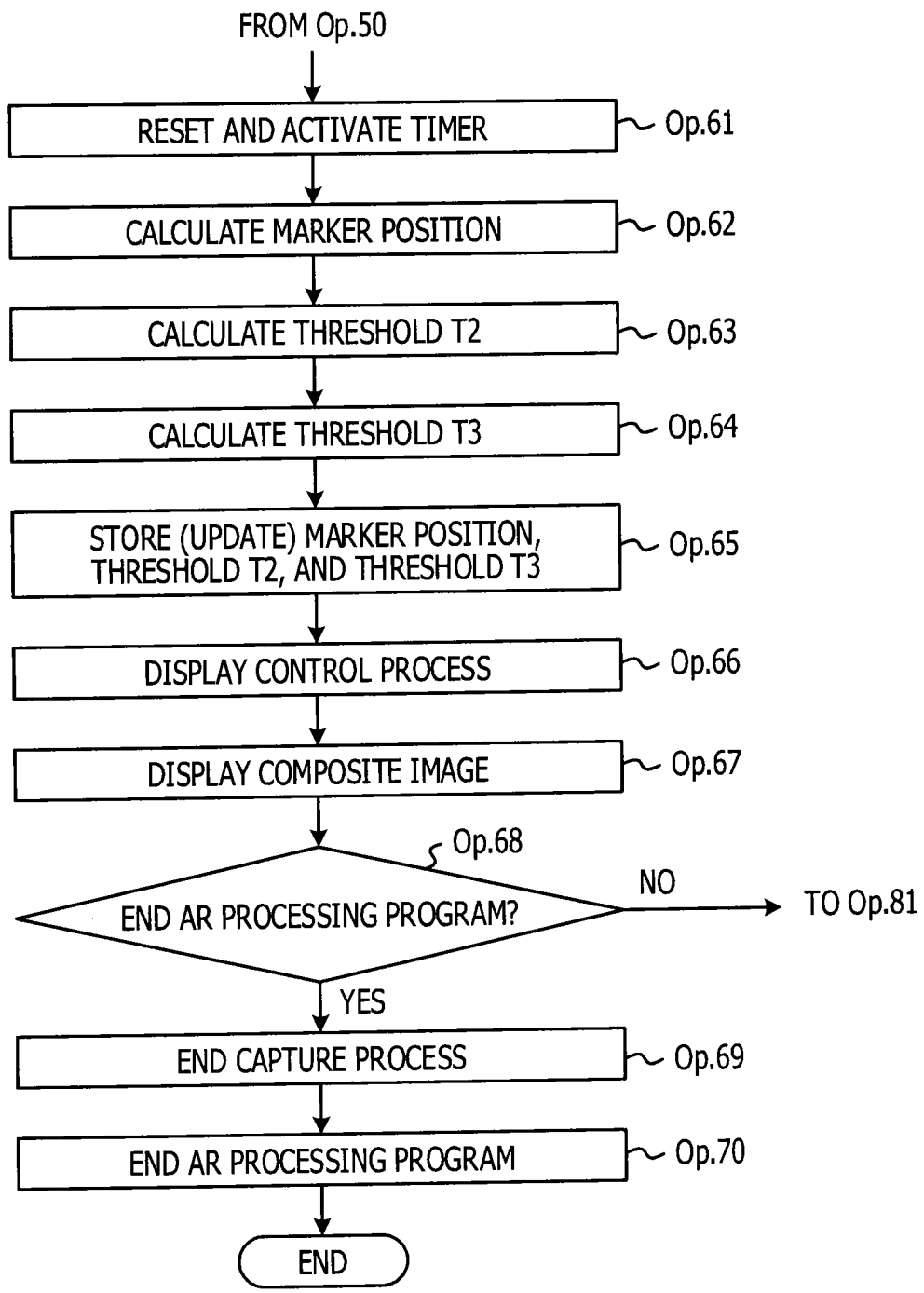
FIG. 16 is a process flow (part 2) of the control method according to the second example.
Figure 17:
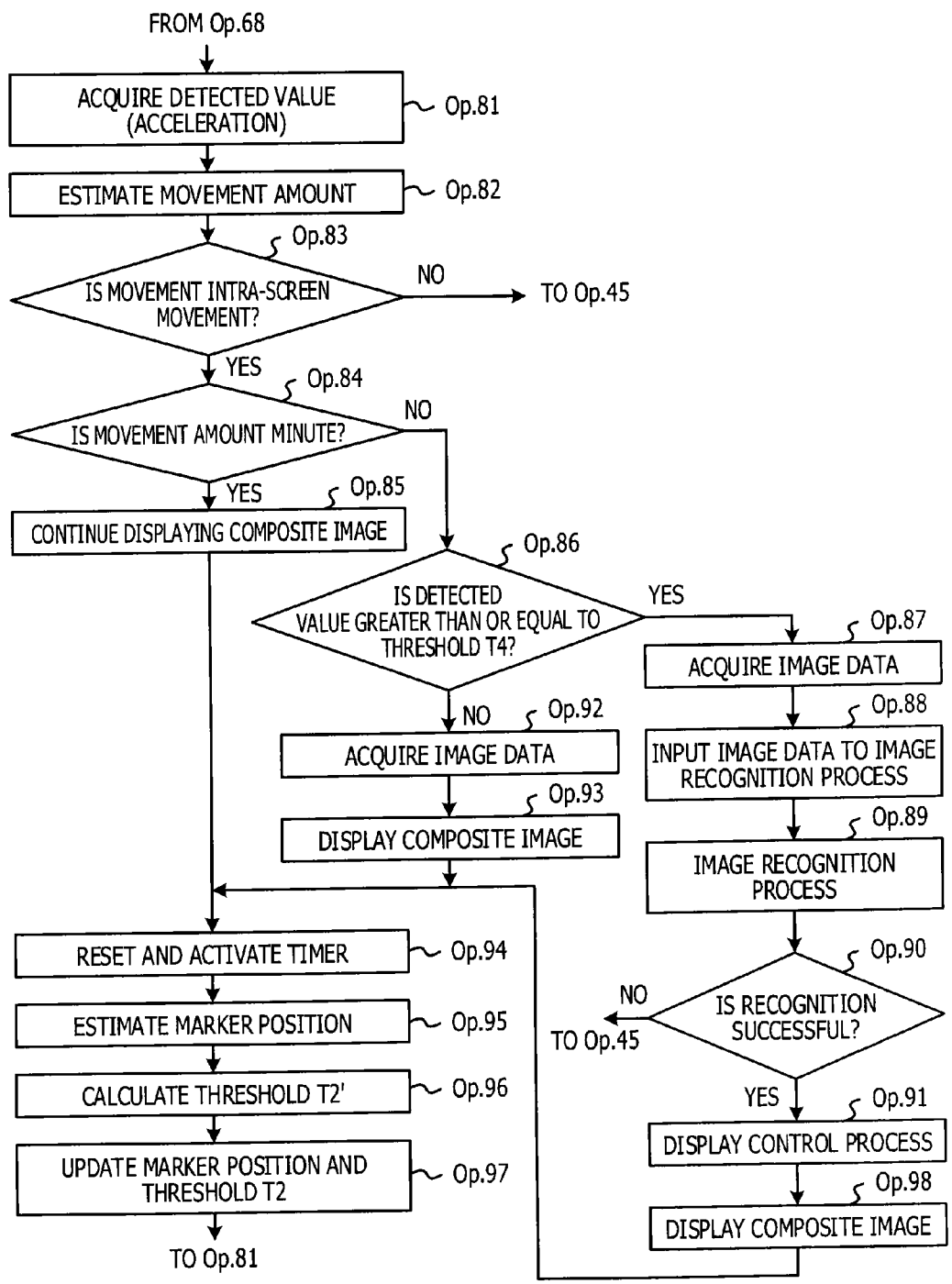
FIG. 17 is a process flow (part 3) of the control method according to the second example.

Next, description will be given of the flow of the processes which are performed by the display device 2. FIGS. 15 to 17 are a process flow of the control method according to the second example. Note that, the control method is executed by the computer which functions as the display device 2 executing the AR processing program.

First, the control unit 20 activates the AR processing program, in the same manner as in the first example (Op. 41). Note that, the series of AR processes including the control process illustrated below are executed by the computer which functions as the display device 2 activating and executing the AR processing program.

The first determination unit 201 determines whether the acceleration is less than or equal to the threshold T1 based on the detected value which is input from the detection unit 25 (Op. 42). Note that, the threshold T1 is a threshold for determining camera shake. The threshold T1 is 0.2 m/s², for example. Here, when the camera shake settles (yes in Op. 42), the control unit 20 causes the capture unit 22 to start the capture process (Op. 43). Note that, the capture process will not start until the camera shake settles (no in Op. 42).

When the capture process starts, the first determination unit 201 determines whether input is received from the capture unit 22 indicating that the process which performs the focusing is complete (Op. 44). Note that, the determination is performed based on whether or not a signal indicating that the auto-focus is complete is input from the capture unit 22 (the camera).

The process waits until the auto-focus is complete (no in Op. 44), and when the auto-focus is complete (yes in Op. 44), the first input control unit 202 acquires the image data from the storage unit 24 (Op. 45). The first input control unit 202 inputs the image data to the first recognition unit 203 (Op. 46).

The first recognition unit 203 executes the image recognition process (Op. 47). When the specific image data is contained in the input image data (yes in Op. 48), the first recognition unit 203 inputs the results of the image recognition process to the second recognition unit 204, and the second recognition unit 204 executes the ID acquisition process (Op. 49). Meanwhile, when the specific image data is not contained in the input image data (no in Op. 48), the control unit 20 returns to Op. 45, and the first input control unit 202 acquires the new image data.

When the second recognition unit 204 succeeds in acquiring the marker ID (yes in Op. 50), the second recognition unit 204 inputs the marker ID and the results of the image recognition process, which are input from the first recognition unit 203, to the first display control unit 206, and the first calculation unit 205 activates the timer (the time measurement unit 26) (Op. 61). Meanwhile, when the second recognition unit 204 fails to acquire the marker ID (no in Op. 50), the control unit 20 returns to Op. 45, and the first input control unit 202 acquires the new image data. Note that, after the ID acquisition process is repeated a predetermined number of times, if the marker ID may be not acquired, the control unit 20 may return to Op. 45.

The first calculation unit 205 calculates the marker position PM based on the region information which is contained in the results of the image recognition process (Op. 62). The first calculation unit 205 calculates the threshold T2 using the marker position PM (Op. 63). The threshold T2 is a threshold for determining whether or not the movement is intra-screen movement. The first calculation unit 205 calculates the threshold T3 (Op. 64). The threshold T3 is a threshold for determining whether or not the movement amount is minute, even when the movement of the marker M is intra-screen movement.

The first calculation unit 205 stores the marker position PM, the threshold T2, and the threshold T3 in the storage unit 24 (Op. 65). Note that, when the threshold T2 and the threshold T3 are already stored in the storage unit 24, the information of the storage unit 24 is updated using the newly calculated threshold T2 and the threshold T3.

The first display control unit 206 performs the display control process based on the results of the image recognition process and the results of the ID acquisition process (Op. 66). Note that, the display control process which is executed by the first display control unit 206 is the same as the display control process (Op. 19) in the first example.

The display unit 23 displays the composite image under the control of the first display control unit 206 (Op. 67). Here, a composite image in which the AR content is displayed superimposed on the image data which is subjected to the image recognition process is displayed.

Next, the control unit 20 determines whether or not to end the AR processing program (Op. 68). When the AR processing program is ended (yes in Op. 68), the capture unit 22 ends the capture process due to the control unit 20 commanding the capture unit 22 to end the capture process (Op. 69). The control unit 20 ends the AR processing program (Op. 70).

Meanwhile, when the AR processing program is not ended (no in Op. 68), the second calculation unit 207 acquires the detected value which is input from the detection unit 25 (Op. 81). The second calculation unit 207 estimates the movement amounts $X_{MA}$ and $Y_{MA}$ of the marker using the detected value (Op. 82). The second determination unit 208 determines whether the movement of the marker M is intra-screen movement using the movement amounts $X_{MA}$ and $Y_{MA}$ of the marker and the threshold T2 (Op. 83). If the movement of the marker M is extra-screen movement (no in Op. 83), process returns to Op. 45, and the first input control unit 202 acquires the new image data.

Meanwhile, if the movement of the marker M is intra-screen movement (yes in Op. 83), it is determined whether the movement of the marker M is a minute movement (Op. 84). For example, the third determination unit 209 compares the absolute values of the movement amounts $X_{MA}$ and $Y_{MA}$ of the marker with the threshold T3.

When the movement is not minute (no in Op. 84), the third determination unit 209 determines whether the movement is swift (Op. 86). In other words, the third determination unit 209 determines whether the detected value (the acceleration) which is already acquired is greater than or equal to the threshold T4 which is set in advance.

When the third determination unit 209 determines that the movement is a swift movement (yes in Op. 86), the second input control unit 210 acquires the new image data (Op. 87). The second input control unit 210 inputs the new image data to the first recognition unit 203 (Op. 88). The first recognition unit 203 executes the image recognition process (Op. 89). Note that, at this time, the ID acquisition process may not be performed.

When the recognition is successful (yes in Op. 90), the first display control unit 206 performs the display control process (Op. 91) based on the results of the image recognition process in Op. 89 and the results of the ID acquisition process in Op. 49. In other words, the disposition of the AR content is determined according to the model view transformation and the perspective transformation. Under the control of the first display control unit 206, the display unit 23 displays the composite image (Op. 98).

Meanwhile, when the recognition fails (no in Op. 90), the control unit 20 returns to Op, 45, and the first input control unit 202 acquires the new image data.

When the movement is not a swift movement (no in Op. 86), the second input control unit 210 acquires the image data from the storage unit 24 (Op. 92). The second input control unit 210 inputs the image data to the second display control unit 211, and the second display control unit 211 generates the composite image. Under the control of the second display control unit 211, the display unit 23 displays the composite image (Op. 93).

The composite image which is displayed in Op. 93 is an image in which the AR content is superimposed on the image data which is acquired in Op. 92. The AR content which is superimposed on the image data is disposed in a position which is determined according to the results of the past image recognition process.

When the movement of the marker M is minute (yes in Op. 84), the second display control unit 211 receives the determination result of the third determination unit 209 and continues displaying the composite image which is displayed in the past (Op. 85).

After Op. 85, Op. 93, and Op. 98 are finished, the second calculation unit 207 enters the update process of the threshold T2. It is possible to appropriately perform the determination process from hereon by dynamically updating the threshold T2. The second calculation unit 207 resets and activates the timer (the time measurement unit 26) (Op. 94). However, since the measured time before the reset is used in the process of Op. 95, the measured time is temporarily stored. Note that, the elapsed time which is newly measured is used when estimating the movement amount of the new marker (Op. 82).

Next, the second calculation unit 207 estimates the marker position PM' at the present time (Op. 95) using the acceleration which is acquired in Op. 81 and the past marker position PM. Note that, in the present example, in Op. 82, since only the estimation of the movement amount is performed and the new marker position PM' is not calculated, in Op. 95, the marker position PM' is estimated using the elapsed time before the timer is reset and the acceleration which is acquired in Op. 81. However, when the marker position PM' is obtained in Op. 82, Op. 95 may not be desired, and the marker position PM' is estimated using the elapsed time until Op. 82 is executed and the acceleration which is acquired in Op. 81.

The marker position PM' (Xs', Ys') at the time at which the acceleration (ax, ay, az) is acquired is obtained using the following equations 9 and 10. However, the elapsed time t which is used in the equations 9 and 10 is the measured time of the timer (the time measurement unit 26) before the timer is reset in Op. 94. Xs and Ys form the marker position PM which is calculated in the past.

$$Xs' = \frac{1}{2}a_x t^2 + v_x t + Xs \quad v_x = \int a_x dt \qquad \text{Equation (9)}$$

$$Ys' = \frac{1}{2}a_y t^2 + v_y t + Ys \quad v_y = \int a_y dt \qquad \text{Equation (10)}$$

Next, the second calculation unit 207 calculates the new threshold T2' using the marker position PM' which is newly estimated (Op. 96). Note that, the threshold T2' is obtained, in the same manner as the threshold T2, using the marker position PM' (Xs', Ys') and the equations 3 to 6.

The second calculation unit 207 updates the marker position PM and the threshold T2 which are calculated in the past with the marker position PM' and the threshold T2' which are newly calculated (Op. 97). Since the threshold T2 is updated at any time by the update process of the threshold T2, the second determination unit 208 may appropriately perform the determination in Op. 83.

As described above, the display device 2 according to the second example may achieve further reduction in the processing load in comparison with the first example by performing finer control of the execution of the image recognition process.

MODIFICATION EXAMPLE OF SECOND EXAMPLE

In the second example, the stopping and the starting (restarting) of the capture process may also be finely controlled. For example, after the process of Op. 61, the control unit 20 ends the capture process which is performed by the capture unit 22. The capture unit 22 restarts the capture process under the control of the control unit 20 in cases such as when the determination in Op. 83 is negative, when the determination in Op. 90 is negative, and when the determination in Op. 84 is negative.

In this manner, since the capture process is restarted when the new image data may be desired, the capture process is stopped during other periods. Accordingly, the processing load and power consumption taken by the capture process which is performed by the capture unit 22 are further reduced.

MODIFICATION EXAMPLE IN ALL EXAMPLES

In other modes of the disclosed examples, a projected image of the AR content may be displayed on a transmission-type display. Even in this mode, since the image of real space which the user obtains by the transmission thereof through the display, and the projected image of the AR content are integrated, the visual information which is provided to the user is augmented.

HARDWARE CONFIGURATION EXAMPLE

Figure 18:
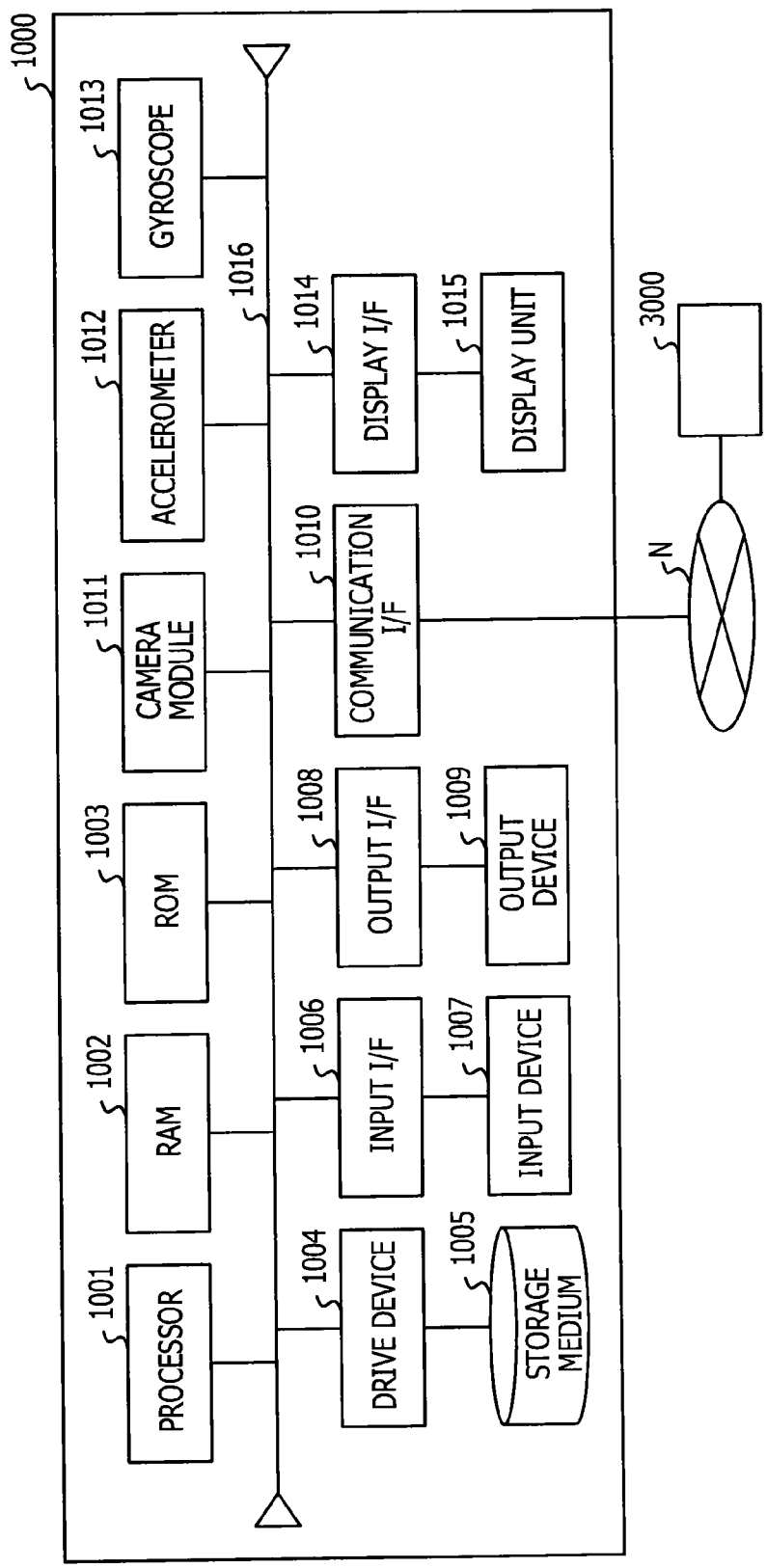
FIG. 18 is a hardware configuration example of the display device of the examples.

Description will be given of the hardware configuration of the display device 1, the display device 2, and the management device 3 which are illustrated in the examples. FIG. 18 is a hardware configuration example of the display device of the examples. The display device in the examples (the display device 1 and the display device 2) are realized by a computer 1000. The functional blocks illustrated in FIGS. 3 and 13 are realized by the hardware configuration illustrated in FIG. 18.

The computer 1000 includes, for example, a processor 1001, a random access memory (RAM) 1002, a read only memory (ROM) 1003, a drive device 1004, a storage medium 1005, an input interface (input I/F) 1006, an input device 1007, an output interface (output I/F) 1008, an output device 1009, a communication interface (communication I/F) 1010, a camera module 1011, an accelerometer 1012, a gyroscope 1013, a display interface 1014, a display device 1015, and a bus 1016. The items of hardware are interconnected via the bus 1016.

The communication interface 1010 performs control of the communication via the network N. The communication which is controlled by the communication interface 1010 may adopt a mode in which the network N is accessed via a wireless base station using wireless communication. An example of the communication interface 1010 is a network interface card (NIC). The input interface 1006 is connected to the input device 1007, and transmits an input signal which is received from the input device 1007 to the processor 1001. The output interface 1008 is connected to the output device 1009, and causes the output device 1009 to execute output according to the instructions of the processor 1001. An example of the input interface 1006 and the output interface 1008 is an I/O controller.

The input device 1007 is a device which transmits an input signal corresponding to an operation. The input device 1007 is a keyed device such as a keyboard or a button attached to the main body of the computer 1000, or a pointing device such as a mouse or a touch panel. The output device 1009 is a device which outputs information according to the control of the processor 1001. The output device 1009 is an audio output device such as a speaker.

The display interface 1014 is connected to the display device 1015. The display interface 1014 causes the display device 1015 to display image information which is written to a display buffer provided in the display interface 1014 by the processor 1001. An example of the display interface 1014 is a graphics card, or a graphics chip. The display device 1015 is a device which outputs information according to the control of the processor 1001. An image output device such as a display, a transmission-type display, or the like is used as the display device 1015.

When the transmission-type display is used, control may be performed such that the projected image of the AR content is displayed at an appropriate position within the transmission-type display, for example, instead of being combined with the captured image. Accordingly, the user may obtain a visual sense of a state in which real space and the AR content are integrated. For example, an input and output device such as a touch screen may be used as the input device 1007 and the display device 1015. For example, the input device 1007 and the display device 1015 may be connected to the computer 1000 from outside instead of the input device 1007 and the display device 1015 being embedded within the computer 1000.

The RAM 1002 is a memory device capable of reading and writing, and, for example, semiconductor memory such as static RAM (SRAM) or dynamic RAM (DRAM), or flash memory other than RAM may be used as the RAM 1002. The ROM 1003 includes a programmable ROM (PROM) or the like.

The drive device 1004 is a device which performs at least one of reading and writing of the information which is stored in the storage medium 1005. The storage medium 1005 stores information which is written by the drive device 1004. The storage medium 1005 is at least one type of storage medium such as a hard disc, a solid state drive (SSD), a compact disc (CD), a digital versatile disc (DVD), and a Blu-ray Disc. For example, the computer 1000 includes the drive device 1004 which supports the type of the storage medium 1005 within the computer 1000.

The camera module 1011 includes a capture element (an image sensor), and writes data, which is obtained by the capture element performing photoelectric conversion, to the image buffer for input images which is included in the camera module 1011. The accelerometer 1012 measures the acceleration acting on the accelerometer 1012. The gyroscope 1013 measures the angular velocity of an operation which is performed by the gyroscope 1013.

The processor 1001 reads out a program which is stored in the ROM 1003 or the storage medium 1005 into the RAM 1002, and performs processes according to the procedure of the program which is read out. For example, the functions of the control unit 10 or the control unit 20 are realized by the processor 1001 performing control of other hardware based on a control program which defines the control methods exemplified in the flowcharts of the examples.

The functions of the communication unit 11 or the communication unit 21 are realized by the processor 1001 controlling the communication interface 1010 to execute data communication, and causing the storage medium 1005 to store the received data. The functions of the capture unit 12 and the capture unit 22 are realized by the camera module 1011 writing the image data to the image buffer for input images, and the processor 1001 reading out the image data within the image buffer for input images. In a monitoring mode, the image data is written to the image buffer for input images, for example, and is written, in parallel, to the display buffer of the display device 1015.

The functions of the display unit 13 and the display unit 23 are realized by the image data which is generated by the processor 1001 being written to the display buffer which is provided in the display interface 1014, and the display device 1015 performing the display of the image data in the display buffer. The functions of the storage unit 14 and the storage unit 24 are realized by the ROM 1003 and the storage medium 1005 storing program files and data files, and by the RAM 1002 being used as the working area of the processor 1001. For example, the AR content information, the template information, and the like are stored in the RAM 1002.

Figure 19:
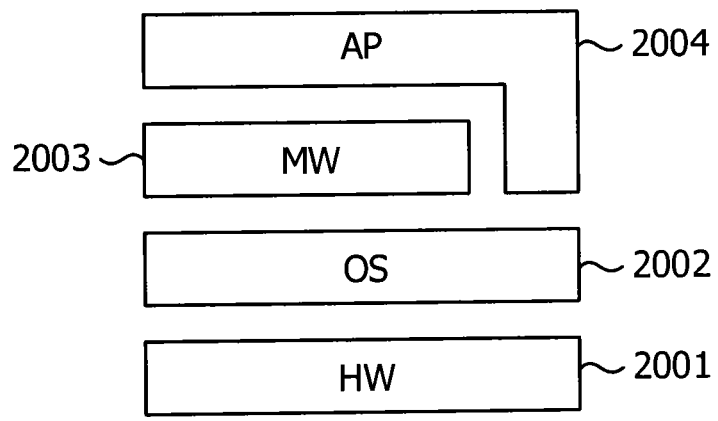
FIG. 19 illustrates a configuration example of a program which runs on a computer.

Next, FIG. 19 illustrates a configuration example of a program which runs on the computer 1000. An operating system (OS) 2002 which performs control of the hardware group runs on the computer 1000. The processes carried out by an application program (AP) 2004 and middleware (MW) 2003 are executed on hardware (HW) 2001 due to the processor 1001 operating using a procedure according to the OS 2002 and the control and management of the HW 2001 being performed.

In the computer 1000, the programs such as the OS 2002, the MW 2003, and the AP 2004 are, for example, read out into the RAM 1002 and executed by the processor 1001. The control programs illustrated in the examples are, for example, programs which are called as the MW 2003 from the AP 2004.

The control program is a program which realizes the AR function as the AP 2004. The control program is stored on the storage medium 1005. The storage medium 1005 may be distributed separately from the main body of the computer 1000 in a state of having the single control program according to the examples stored thereon, or having an AR control program including other programs stored thereon.

The program of the MW 2003 and the program of the AP 2004 may cooperate to realize the processing units illustrated in the functional block diagram of the display device 1 or the display device 2. For example, the determination unit 16, the input control unit 17, and the display control unit 19 illustrated in FIG. 3 may be realized by the MW 2003, and the recognition unit 18 may be realized by the AP 2004.

Next, description will be given of the hardware configuration of the management device 3 in the examples. FIG. 20 is a hardware configuration example of the management device 3. The management device 3 is realized by a computer 3000. The management device 3 is, for example, realized by the hardware configuration illustrated in FIG. 20.

The computer 3000 includes, for example, a processor 3001, a RAM 3002, a ROM 3003, a drive device 3004, a storage medium 3005, an input interface (input I/F) 3006, an input device 3007, an output interface (output I/F) 3008, an output device 3009, a communication interface (communication I/F) 3010, a storage area network (SAN) interface (SAN I/F) 3011, and a bus 3012. The items of hardware are interconnected via the bus 3012.

For example, the processor 3001 is the same hardware as the processor 1001. For example, the RAM 3002 is the same hardware as the RAM 1002. For example, the ROM 3003 is the same hardware as the ROM 1003. For example, the drive device 3004 is the same hardware as the drive device 1004. For example, the storage medium 3005 is the same hardware as the storage medium 1005. For example, the input interface (input I/F) 3006 is the same hardware as the input interface 1006. For example, the input device 3007 is the same hardware as the input device 1007.

For example, the output interface (output I/F) 3008 is the same hardware as the output interface 1008. For example, the output device 3009 is the same hardware as the output device 1009. For example, the communication interface (communication I/F) 3010 is the same hardware as the communication interface 1010. The storage area network (SAN) interface (SAN I/F) 3011 is an interface for connecting the computer 3000 to a SAN, and includes a host bus adapter (HBA).

The processor 3001 reads out a management program which is stored in the ROM 3003 or the storage medium 3005 into the RAM 3002, and performs processes according to the procedure of the management program which is read out. At this time, the RAM 3002 is used as the working area of the processor 3001. Note that, the management program is a program according to the management functions of the management device 3, and when the display control is performed at the management device 3 side, the management program also includes the display control program according to the examples.

The management device 3 stores various information due to the ROM 3003 and the storage medium 3005 storing the program files and the data files, or, due to the RAM 3002 being used as the working area of the processor 3001. The processor 3001 performs the communication process by controlling the communication interface 3010.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A display device, comprising:
  circuitry for
    selectively executing a first control and a second control, the first control performing both a capture process by an image capturing device and an image recognition process which detects a specific object from an image captured by the image capturing device, and the second control performing the capture process from among the capture process and the image recognition process; and
    displaying a content, corresponding to the specific object on the image and at a predetermined positional relationship with the specific object, during an execution of the first control when the specific object is detected from the image in the image recognition process during the execution of the first control, wherein
  the image recognition process includes
    detecting movement of the specific object;
    determining, whether the movement of the specific object is an intra-image movement based on a first threshold;
    when the movement is an intra-image movement, comparing the movement to a minimum threshold; and
    when the movement is greater than the minimum threshold, determining whether the movement is a swift movement based on a second threshold.

2. The display device according to claim 1, wherein the circuitry is for controlling to terminate the capture process and the image recognition process when an end instruction is received.

3. The display device according to claim 1, wherein
  the circuitry is for controlling to input the image to the image recognition process during the execution of the first control, and
  the circuitry is for controlling not to input the image to the recognition process during another execution of the second control.

4. The display device according to claim 1, wherein
  the first control and the second control are executed based on a state of the display device,
  the state is a movement state of the display device,
  the second control is executed when the movement state indicates that the display device is moving, and
  the first control is executed when the movement state indicates that the display device is not moving.

5. The display device according to claim 4, wherein the movement state is determined according to a value which is input from an accelerometer in the display device.

6. The display device according to claim 1, wherein
  the specific object is an augmented reality (AR) marker, and
  the circuitry is for transforming coordinates of the content from a coordinate system of the specific object to a coordinate system of the image capturing device capturing the image, and then display the content superimposed upon the image in the coordinate system of the image capturing device.

7. The display device according to claim 1, wherein the content includes a message, directed to a user of the display device, relating to a state of the specific object.

8. The display device according to claim 7, wherein the content is superimposed upon the image at the predetermined positional relationship with the specific object.

9. The display device according to claim 1, wherein when the movement of the specific object is determined to not be an intra-image movement, the image capturing device executes a new capture process to capture a new image.

10. The display device according to claim 1, wherein when the movement is less than the minimum threshold, the circuitry continues to display the content at the predetermined positional relationship with the specific object.

11. The display device according to claim 1, wherein when the movement is less than the second threshold, the circuitry determines that the movement is not a swift movement and the circuitry displays the image with the content at a predetermined positional relationship with the specific object.

12. The display device according to claim 1, wherein when the movement is greater than the second threshold, the circuitry determines that the movement is a swift movement and the image capturing device executes a new capture process to capture a new image.

13. A control method comprising:
  selectively executing, by circuitry, a first control and a second control, the first control performing both a capture process by an image capturing device and an image recognition process which detects specific object from an image captured by the image capturing device, and the second control performing the capture process from among the capture process and the image recognition process; and
  displaying a content, corresponding to the specific object on the image and at a predetermined positional relationship with the specific object, during an execution of the first control when the specific object is detected from the image in the image recognition process during the execution of the first control, wherein
  the image recognition process includes
    detecting movement of the specific object;
    determining whether the movement of the specific object is an intra-image movement based on a first threshold;
    when the movement is an intra-image movement comparing the movement to, a minimum threshold; and
    when the movement is greater than the minimum threshold, determining whether the movement is a swift movement based on a second threshold.

14. The control method according to claim 13, further comprising:
  controlling to terminate the capture process and the image recognition process when an end instruction is received.

15. The control method according to claim 13, further comprising:
  controlling to input the image to the image recognition process during the execution of the first control; and
  controlling not to input the image to the recognition process during another execution of the second control.

16. The control method according to claim 13, wherein
  the selectively executing is executed based on a state of a display device including the circuitry,
  the state is a movement state of the display device,
  the second control is executed when the movement state indicates that the display device is moving, and
  the first control is executed when the movement state indicates that the display device is not moving.

17. The control method according to claim 16, wherein the movement state is determined according to a value which is input from an accelerometer in the display device.

18. A non-transitory computer-readable medium including computer program, which when executed by a display device, causes the display device to:
selectively execute a first control and a second control, the first control performing both a capture process by an image capturing device and an image recognition process which detects specific object from an image captured by the image capturing device, and the second control performing the capture process from among the capture process and the image recognition process, and
display a content, corresponding to the specific object on the image and at a predetermined positional relationship with the specific object, during an execution of the first control when the specific object is detected from the image in the image recognition process during the execution of the first control, wherein
the image recognition process includes
detecting movement of the specific object,
determining whether the movement of the specific object is an intra-image movement based on a first threshold;
when the movement is an intra-image movement, comparing the movement to a minimum threshold; and
when the movement is greater than the minimum threshold, determining whether the movement is a swift movement based on a second threshold.

19. The non-transitory computer-readable medium according to claim 18, wherein the program causes the display device to:
control to terminate the capture process and the image recognition process when an end instruction is received.

20. The non-transitory computer-readable medium according to claim 18, wherein the program causes the display device to:
control to input the image to the image recognition process during the execution of the first control, and
control not to input the image to the recognition process during another execution of the second control.

* * * * *